(12) United States Patent
 Zhang et al.

(10) Patent No.: US 11,765,368 B2
(45) Date of Patent: Sep. 19, 2023

(54) CROSS-COMPONENT ADAPTIVE LOOP FILTER

(71) Applicants:Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/879,956

(22) Filed: Aug. 3, 2022

(65) Prior Publication Data

US 2022/0394281 A1    Dec. 8, 2022

Related U.S. Application Data

(63) Continuation of application No. PCT/CN2021/074806, filed on Feb. 2, 2021.

(30) Foreign Application Priority Data

Feb. 3, 2020 (WO) ................ PCT/CN2020/074222

(51) Int. Cl.
 *H04N 19/186* (2014.01)
 *H04N 19/117* (2014.01)
 (Continued)

(52) U.S. Cl.
 CPC ......... *H04N 19/186* (2014.11); *H04N 19/117* (2014.11); *H04N 19/82* (2014.11); *H04N 19/96* (2014.11)

(58) Field of Classification Search
 CPC .... H04N 19/186; H04N 19/117; H04N 19/82; H04N 19/96; H04N 19/105; H04N 19/119; H04N 19/174; H04N 19/70
 (Continued)

(56) References Cited

U.S. PATENT DOCUMENTS

2013/0322523 A1* 12/2013 Huang ................ H04N 19/134
                                                     375/240.02
2016/0241880 A1*  8/2016 Chao ...................... H04N 19/86
                      (Continued)

FOREIGN PATENT DOCUMENTS

GN    109600611 A      4/2019
NO    2019054200 A1    3/2019

OTHER PUBLICATIONS

Foreign Communication From A Related Counterpart Application, International Application No. PCT/CN2021/074806, English Translation of International Search Report dated May 8, 2021, 13 pages.
(Continued)

*Primary Examiner* — Tung T Vo
(74) *Attorney, Agent, or Firm* — Conley Rose, P.C.

(57) ABSTRACT

Methods, systems and apparatus for video processing including coding or decoding are described. One example method of video processing includes determining, for a conversion between a video region of a chroma component of a video and a bitstream of the video, a manner of applying a cross-component adaptive loop filtering (CC-ALF) operation to a first sample of the chroma component based on a position of a second sample associated with the first sample. The method also includes performing the conversion based on the determining.

20 Claims, 32 Drawing Sheets

(51) Int. Cl.
*H04N 19/82* (2014.01)
*H04N 19/96* (2014.01)

(58) Field of Classification Search
USPC .................................................. 375/240.2
See application file for complete search history.

(56) References Cited

U.S. PATENT DOCUMENTS

| | | | |
|---|---|---|---|
| 2016/0241881 A1* | 8/2016 | Chao | H04N 19/182 |
| 2017/0085867 A1* | 3/2017 | Baran | H04N 13/122 |
| 2022/0377324 A1* | 11/2022 | Yang | H04N 19/117 |
| 2022/0377353 A1* | 11/2022 | Zhang | H04N 19/176 |
| 2022/0408085 A1* | 12/2022 | Lim | H04N 19/186 |

OTHER PUBLICATIONS

Document: JVET-Q2001-vB, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 519 pages.

Suehring, K., Retrieved From the Internet: https://vcgit.hhi.fraunhofer.de/jvet/VVCSoftware_VTM/-/tags/VTM-7.0, Oct. 24, 2022, 2 pages.

Document: JVET-Q0820-v3, Lagrange, P., et al., "ACT: common text for bug fixes and transform change," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.

Document: JVET-P0820, Choi, K., et al., "Cross-check of JVET-P0163 (CE5-related: SAO encoder-only improvements)," Joint Video Experts Team (JVET) of ITU-T SG 16 WP 3 and ISO/IEC JTC 1/SC 29/WG 11 16th Meeting: Geneva, CH, Oct. 1-11, 2019, 1 page.

Document: JVET-P0080, Misra, K., et al., "CE5-2.1, CE5-2.2: Cross Component Adaptive Loop Filter," Joint Video Experts Team (JVET) of ITU-T SG 16 WP 3 and ISO/IEC JTC 1/SC 29/WG 11, 16th Meeting: Geneva, CH, Oct. 1-11, 2019, 7 pages.

Document: JVET-O0636_r1, Misra, K., et al., "Cross-Component Adaptive Loop Filter for chroma," Joint Video Experts Team (JVET) of ITU-T SG 16 WP 3 and ISO/IEC JTC 1/SC 29/WG 11, 15th Meeting: Gothenburg, SE, Jul. 3-12, 2019, 9 pages.

Document: P1008-v2, Misra, K., et al., "CE5-related: On the design of CC-ALF," Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.

Document: JVET-P2025, Chen, C., et al., "Description of Core Experiment 5 (CE5): Cross Component Adaptative Loop Filtering," Joint Video Experts Team (JVET) of ITU-T SG 16 WP 3 and ISO/IEC JTC 1/SC 29/WG 11, 16thMeeting: Geneva, CH, Oct. 1-11, 2019, 6 pages.

Document: JVET-Q0304, Yao, L., et al., "Non-CE5: Non-Linear Cross Component Adaptive Loop Filter," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Document: JVET-Q0058, Misra, K., et al., "CE5 Common Base: Cross Component Adaptive Loop Filter," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

* cited by examiner

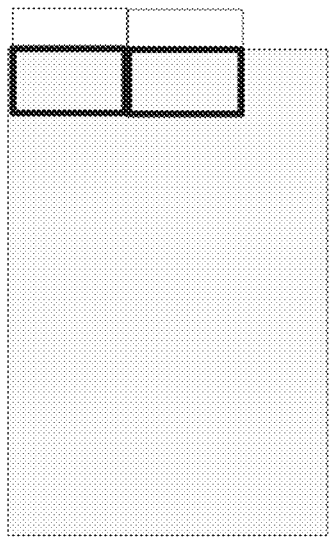
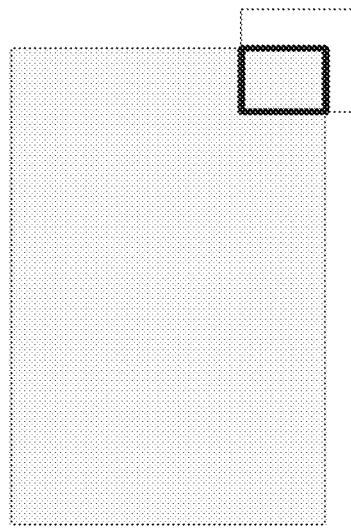
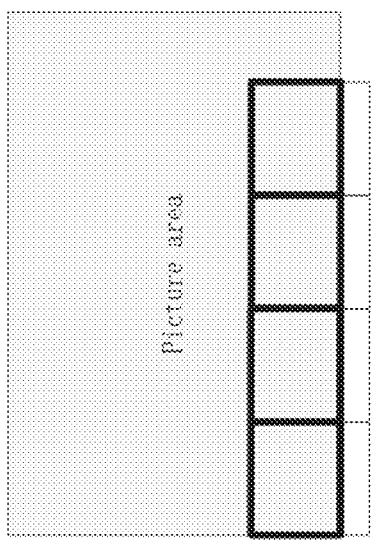
FIG. 7A
FIG. 7B
FIG. 7C

CROSS-COMPONENT ADAPTIVE LOOP FILTER

CROSS REFERENCE TO RELATED APPLICATIONS

This application is a continuation of International Patent Application No. PCT/CN2021/074806 filed on Feb. 2, 2021, which claims the priority to and benefits of International Patent Application No. PCT/CN2020/074222 filed on Feb. 3, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to use cross-component adaptive loop filtering and other chroma coding tools during video encoding or decoding.

In one example aspect, a video processing method is disclosed. The method includes determining, for a conversion between a video region of a chroma component of a video and a bitstream of the video, a manner of applying a cross-component adaptive loop filtering (CC-ALF, or CCALF) operation to a first sample of the chroma component based on a position of a second sample associated with the first sample. The method also includes performing the conversion based on the determining.

In another example aspect, a video processing method is disclosed. The method includes performing a conversion between a video region of a video and a bitstream of the video. One or more syntax elements related to use of a cross-component adaptive loop filtering (CC-ALF) operation in the conversion are conditionally included in an adaptation parameter set based on a syntax element related to an adaptive loop filtering (ALF) operation.

In another example aspect, a video processing method is disclosed. The method includes performing a conversion between a video region of a video and a bitstream of the video. A first syntax element is included in the bitstream indicative of whether an adaptive loop filter (ALF) or a cross-component adaptive loop filter (CC-ALF) is applied during the conversion of the video region.

In another example aspect, a video processing method is disclosed. The method includes performing a conversion between a video region of a video and a coded representation of the video. One or more syntax elements related to an adaptive loop filtering (ALF) operation for a chroma component are conditionally included in an adaptation parameter set based on a characteristic of the ALF operation.

In another example aspect, a video processing method is disclosed. The method includes performing a conversion between a video and a bitstream of the video. The bitstream conforms to a format rule specifying that use of a luma mapping with chroma scaling (LMCS) coding mode is controlled using a two-level signaling mechanism comprising signaling at a first level of a first video region and a second level of a second video region associated in the first video region. The first level is higher than the second level. The LMCS coding mode comprises performing the conversion using a reshaping process in which sample values represented in a first domain are mapped to a reshaped domain and a luma-dependent chroma residual scaling (CRS) process.

In another example aspect, a video processing method is disclosed. The method includes performing a conversion between a video region of a video and a bitstream of the video. The bitstream conforms to a format rule specifying that, in case a syntax flag indicates that the video region is split using a quad-tree split method, a value of a syntax element indicating a split mode is not equal to any of (1) a horizontal ternary tree split mode, (2) a horizontal binary tree split mode, (3) a vertical ternary tree split mode, or (4) a vertical binary tree split mode.

In another example aspect, a video processing method is disclosed. The method includes determining, for a conversion between a current video block of a video and a coded representation of the video, a characteristic of a cross-component adaptive loop filter based on a position of a color component sample; and performing the conversion using the characteristic of the cross-component adaptive loop filter.

In another example aspect, another video processing method is disclosed. The method includes performing a conversion between a video region of a video and a coded representation of the video. One or more syntax elements related to use of cross-component adaptive loop filtering in the conversion are conditionally including in the coded representation based on whether another syntax element related to an adaptive loop filtering is included in the coded representation.

In another example aspect, another video processing method is disclosed. The method includes performing a conversion between a video region of a video and a coded representation of the video. A first syntax element is included in the coded representation indicative of whether an adaptive loop filter or a cross-component adaptive loop filter is applied during the conversion of the video region.

In another example aspect, another video processing method is disclosed. The method includes performing a conversion between a video region of a video and a coded representation of the video. The syntax elements related to adaptive loop filtering for chroma components are conditionally included in an adaptation parameter set depending on a coding condition.

In another example aspect, another video processing method is disclosed. The method includes performing a conversion between a video region of a video and a coded representation of the video. A format rule for the coded representations defines syntax elements that control use of a coding mode during the conversion at two levels of the video. The coding mode comprises performing the conversion of the video region using a reshaping process in which sample values are represented in a first domain and a second domain and a luma dependent chroma residual scaling step.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIGS. 7A-7C show examples of coding tree blocks (CTBs) crossing picture borders, where FIG. 7A shows K=M, L<N; where FIG. 7B shows K<M, L=N; and where FIG. 7C shows K<M, L<N.

FIG. 12A shows an example of subsampled Laplacian calculation.

FIG. 12B shows another example of subsampled Laplacian calculation.

FIG. 12C shows another example of subsampled Laplacian calculation.

FIG. 12D shows yet another example of subsampled Laplacian calculation.

DETAILED DESCRIPTION

Figure 2:
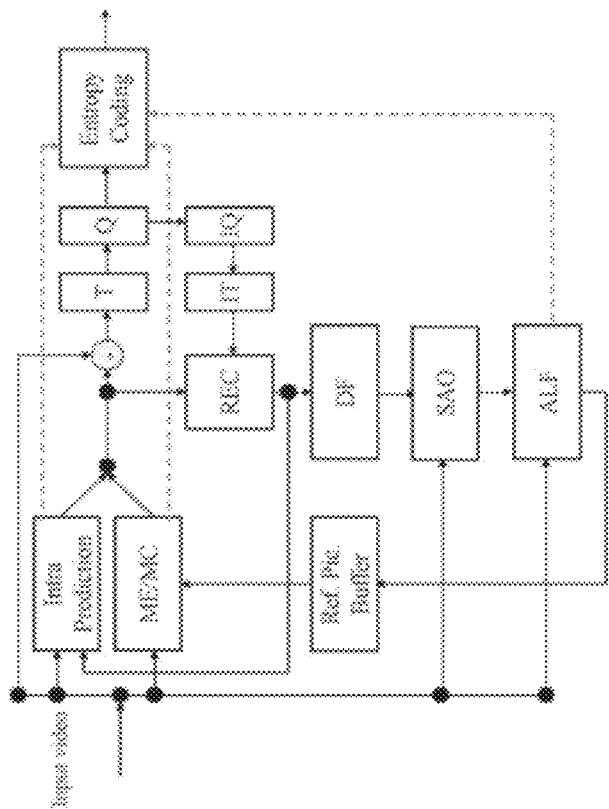
FIG. 2 shows an example of encoder block diagram.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Overview

This document is related to video coding technologies. Specifically, this document is related to the Cross-Component Adaptive Loop Filter (CC-ALF) and other coding tools which are applied to chroma components. This document may be applied to the existing video coding standard like High Efficiency Video Coding (HEVC), or the standard (Versatile Video Coding) to be finalized. This document may be also applicable to future video coding standards or video codec.

2. Initial Discussion

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (WET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Color Space and Chroma Subsampling

Color space, also known as the color model (or color system), is an abstract mathematical model which simply describes the range of colors as tuples of numbers, typically as 3 or 4 values or color components (e.g., red green blue, RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

Figure 1:
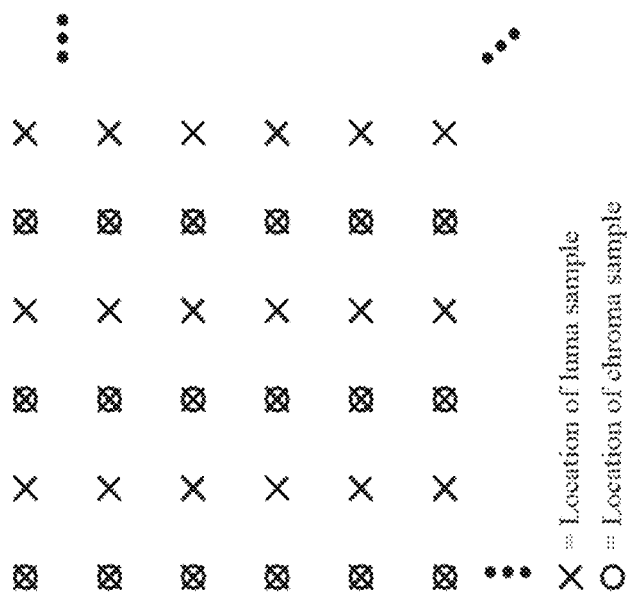
FIG. 1 shows nominal vertical and horizontal locations of 4:2:2 luma and chroma samples in a picture.

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 1.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2. Cb and Cr are cosited horizontally. Cb and Cr are sited between pixels in the vertical direction (sited interstitially).

In JPEG/JFIF, H.261, and MPEG-1. Cb and Cr are sited interstitially, halfway between alternate luma samples.

In 4:2:0 DV, Cb and Cr are co-sited in the horizontal direction. In the vertical direction, they are co-sited on alternating lines.

TABLE 1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

2.2. Coding Flow of a Typical Video Codec

FIG. 2 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3. Definitions of Video Units

A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 3:
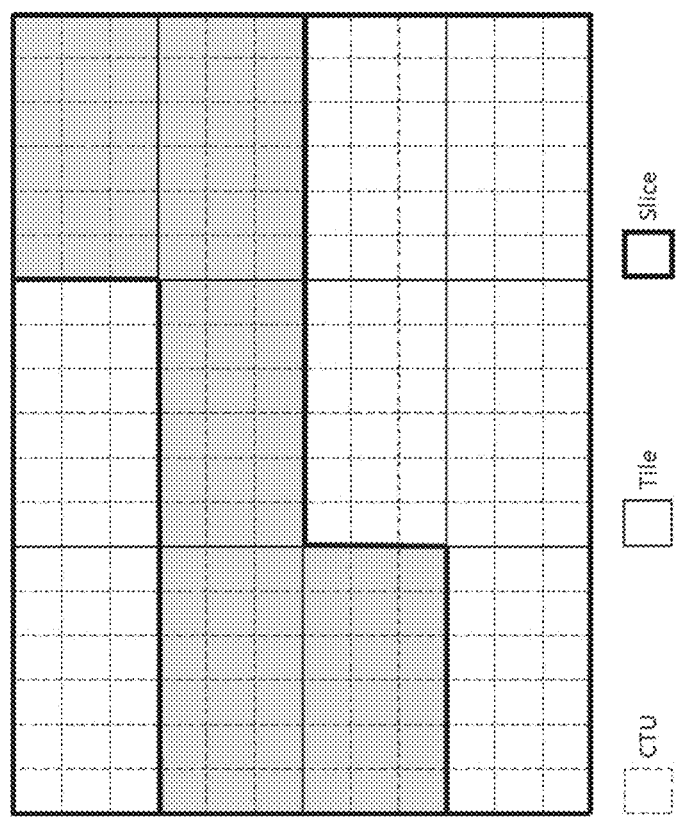
FIG. 3 is an example picture with 18 by 12 luma coding tree units (CTUs) partitioned into 12 tiles and 3 raster-scan slices.

FIG. 3 shows an example of raster-scan slice partitioning of a picture, where the picture is divided into 12 tiles and 3 raster-scan slices.

Figure 4:
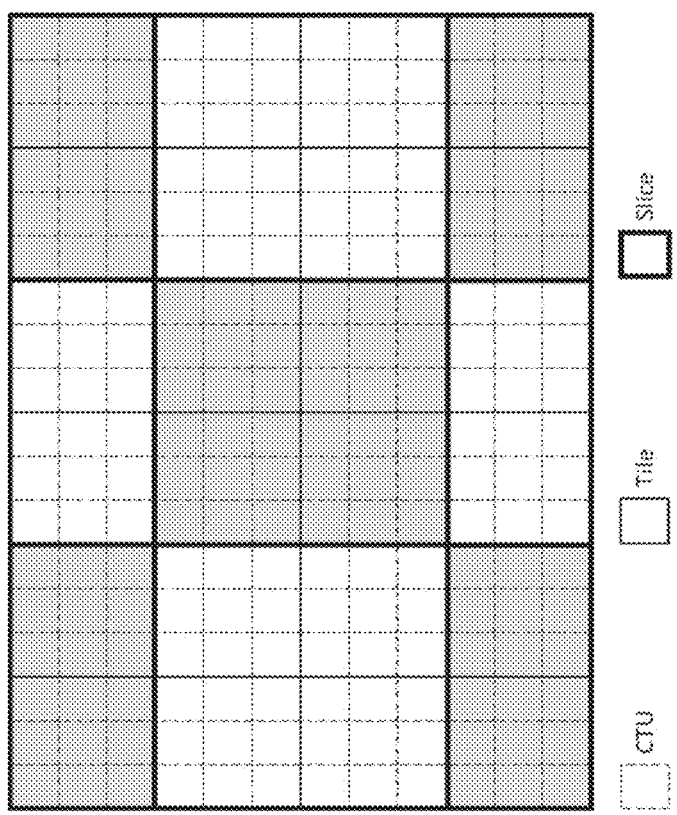
FIG. 4 shows a picture with 18 by 12 luma CTUs partitioned into 24 tiles and 9 rectangular slices.

FIG. 4 shows an example in the VVC specification shows an example of rectangular slice partitioning of a picture, where the picture is divided into 24 tiles (6 tile columns and 4 tile rows) and 9 rectangular slices.

Figure 5:
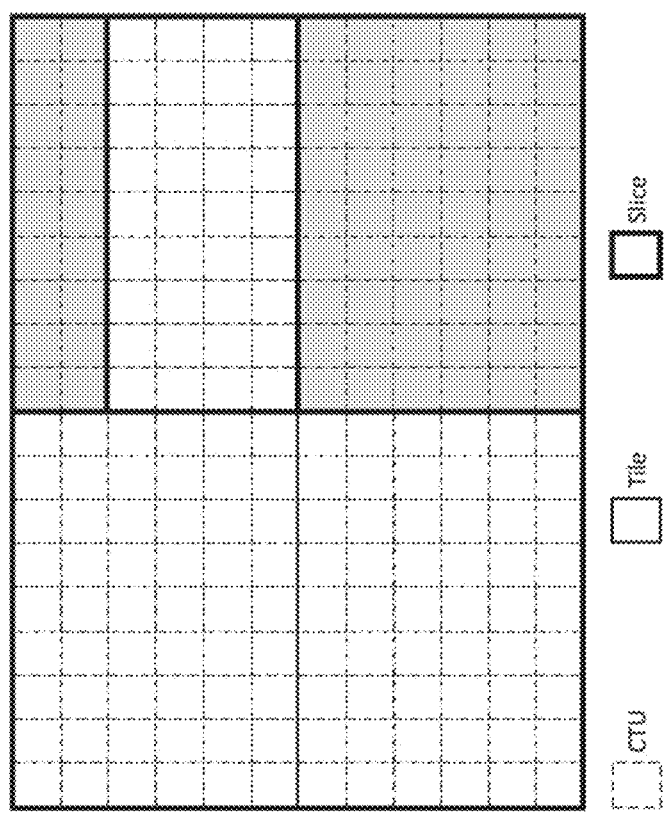
FIG. 5 shows a picture partitioned into 4 tiles and 4 rectangular slices (informative).

FIG. 5 shows an example of a picture partitioned into tiles and rectangular slices, where the picture is divided into 4 tiles (2 tile columns and 2 tile rows) and 4 rectangular slices.

Figure 6:
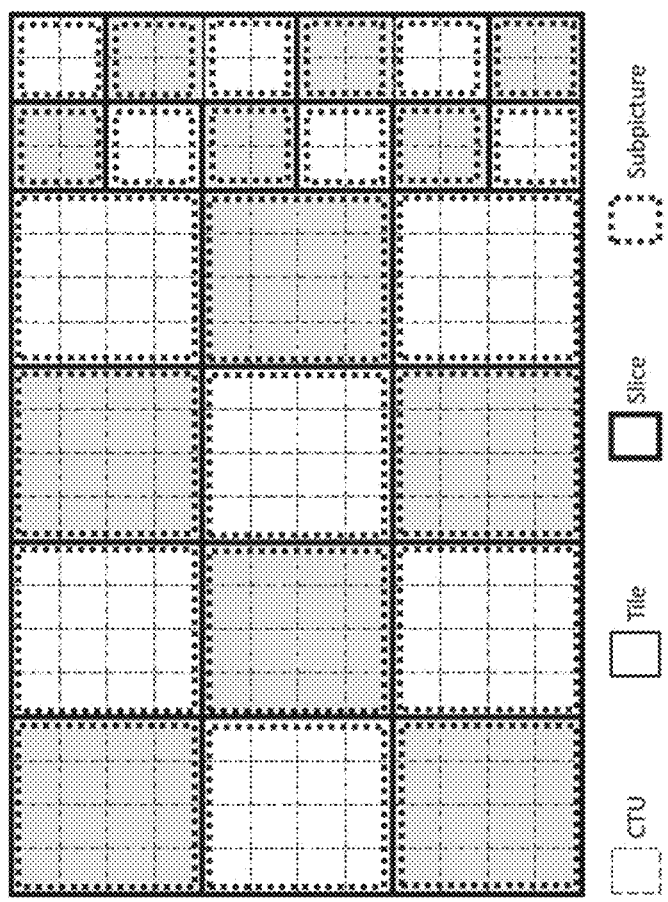
FIG. 6 is a picture partitioned into 15 tiles, 24 slices and 24 subpictures (informative).

FIG. 6 shows an example of subpicture partitioning of a picture, where a picture is partitioned into 15 tiles covering 4 by 4 CTUs, 24 slices and 24 subpictures of varying dimensions.

2.3.1. CTU/CTB Sizes

In VVC, the CTU size, signaled in sequence parameter set (SPS) by the syntax element log 2_ctu_size_minus2, could be as small as 4×4.

7.3.2.3 Sequence Parameter Set RBSP Syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1) | |
| gra_enabled_flag | u(1) |
| sps_seq_parameter_set_id | ue(v) |
| chroma_format_idc | ue(v) |
| if( chroma_format_idc = = 3 ) | |
|    separate_colour_plane_flag | u(1) |
| pic_width_in_luma_samples | ue(v) |
| pic_height_in_luma_samples | ue(v) |
| conformance_window_flag | u(1) |
| if( conformance_window_flag) { | |
|    conf_win_left_offset | ue(v) |
|    conf_win_right_offset | ue(v) |
|    conf_win_top_offset | ue(v) |
|    conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps max sub layers minus1 ); | |
|    i <= sps_max_sub_layers_minus1; i++) { | |
|    sps_max_dec_pic_buffering_minus1[ i ] | ue(v) |
|    sps_max_num_reorder_pics[ i ] | ue(v) |
|    sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|    num_ref_pic_lists_in_sps[ i ] | ue(v) |
|    for( j = 0; j < num_ref_pic_lists_in_sps[ i ]; j++) | |
|      ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|    sps_log2_diff_max_bt_min_qt_intra_slice_luma | ue(v) |
|    sps_log2_diff_max_tt_min_qt_intra_slice_luma | ue(v) |
| } | |
| if( sps_max_mtt_hierarchy_depth_inter_slices != 0 ) { | |
|    sps_log2_diff_max_bt_min_qt_inter_slice | ue(v) |
|    sps_log2_diff_max_tt_min_qt_inter_slice | ue(v) |
| } | |
| if( qtbtt_dual_tree_intra_flag) { | |
|    sps_log2_diff_min_qt_min_cb_intra_slice_chroma | ue(v) |
|    sps_max_mtt_hierarchy_depth_intra_slice_chroma | ue(v) |
|    if ( sps_max_mtt_hierarchy_depth_intra_slice_chroma != 0 ) { | |
|      sps_log2_diff_max_bt_min_qt_intra_slice_chroma | ue(v) |
|      sps_log2_diff_max_tt_min_qt_intra_slice_chroma | ue(v) |
|    } | |
| } | |
| ... | |
| rbsp_trailing_bits( ) | |
| } | | log 2_ctu_size_minus2 plus 2 specifies the luma coding tree block size of each CTU.

log 2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinCbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$\text{CtbLog2SizeY} = \log 2\_\text{ctu\_size\_minus2} + 2 \quad (7\text{-}9)$$

$$\text{CtbSizeY} = 1 << \text{CtbLog2SizeY} \quad (7\text{-}10)$$

$$\text{MinCbLog2SizeY} = \log 2\_\text{min\_luma\_coding\_block\_size\_minus2} + 2 \quad (7\text{-}11)$$

$$\text{MinCbSizeY} = 1 << \text{MinCbLog2SizeY} \quad (7\text{-}12)$$

$$\text{MinTbLog2SizeY} = 2 \quad (7\text{-}13)$$

$$\text{MaxTbLog2SizeY} = 6 \quad (7\text{-}14)$$

$$\text{MinCbSizeY} = 1 << \text{MinTbLog2SizeY} \quad (7\text{-}15)$$

$$\text{MaxTbSizeY} = 1 << \text{MaxTbLog2SizeY} \quad (7\text{-}16)$$

$$\text{PicWidthInCtbsY} = \text{Ceil}(\text{pic\_width\_in\_luma\_samples} \div \text{CtbSizeY}) \quad (7\text{-}17)$$

$$\text{PicHeightInCtbsY} = \text{Ceil}(\text{pic\_height\_in\_luma\_samples} \div \text{CtbSizeY}) \quad (7\text{-}18)$$

$$\text{PicSizeInCtbsY} = \text{PicWidthInCtbsY} * \text{PicHeightInCtbsY} \quad (7\text{-}19)$$

$$\text{PicWidthInMinCbsY} = \text{pic\_width\_in\_luma\_samples} / \text{MinCbSizeY} \quad (7\text{-}20)$$

$$\text{PicHeightInMinCbsY} = \text{pic\_height\_in\_luma\_samples} / \text{MinCbSizeY} \quad (7\text{-}21)$$

$$\text{PicSizeInMinCbsY} = \text{PicWidthInMinCbsY} * \text{PicHeightInMinCbsY} \quad (7\text{-}22)$$

$$\text{PicSizeInSamplesY} = \text{pic\_width\_in\_luma\_samples} * \text{pic\_height\_in\_luma\_samples} \quad (7\text{-}23)$$

$$\text{PicWidthInSamplesC} = \text{pic\_width\_in\_luma\_samples} / \text{SubWidthC} \quad (7\text{-}24)$$

$$\text{PicHeightInSamplesC} = \text{pic\_height\_in\_luma\_samples} / \text{SubHeightC} \quad (7\text{-}25)$$

2.3.2. CTUs in a Picture

Suppose the CTB/largest coding unit (LCU) size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs as depicted in FIGS. 7A-7C the CTB size is still equal to M×N, however, the bottom boundary/right boundary of the CTB is outside the picture.

FIG. 7A shows CTBs crossing the bottom picture border.
FIG. 7B shows CTBs crossing the right picture border.
FIG. 7C shows CTBs crossing the right bottom picture border.

2.4. Deblocking Filter (DB)

The input of DB is the reconstructed samples before in-loop filters.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Figure 8:
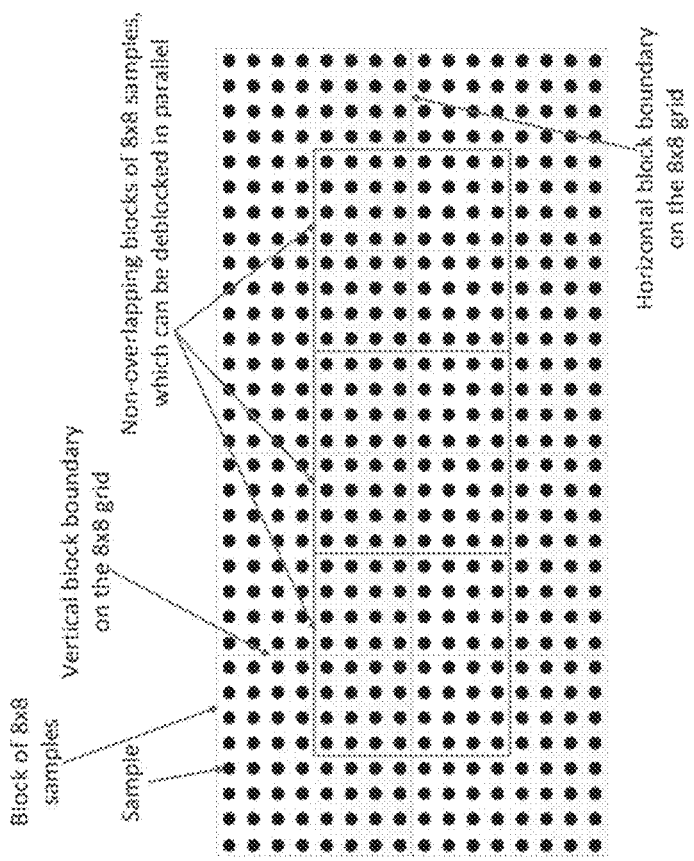
FIG. 8 is an illustration of picture samples and horizontal and vertical block boundaries on the 8×8 grid, and the nonoverlapping blocks of the 8×8 samples, which can be deblocked in parallel.

FIG. 8 is an illustration of picture samples and horizontal and vertical block boundaries on the 8×8 grid, and the nonoverlapping blocks of the 8×8 samples, which can be deblocked in parallel.

2.4.1. Boundary Decision

Filtering is applied to 8×8 block boundaries. In addition, it must be a transform block boundary or a coding subblock boundary (e.g., due to usage of advanced temporal motion vector prediction (ATMVP)). For those which are not such boundaries, the filter is disabled.

2.4.2. Boundary Strength Calculation

For a transform block boundary/coding subblock boundary, if the boundary is located in the 8×8 grid, the boundary may be filtered and the setting of $bS[xD_i][yD_j]$ (wherein $[xD_i][yD_j]$ denotes the coordinate) for this edge is defined in Table 2 and Table 3, respectively.

TABLE 2

Boundary strength (when SPS IBC is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2f or bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 3

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.4.3. Deblocking Decision for Luma Component

The deblocking decision process is described in this sub-section.

Figure 9:
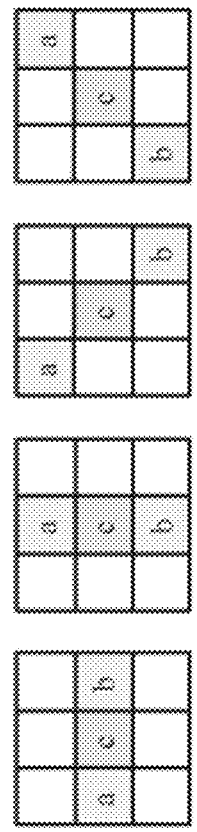
FIG. 9 shows examples of pixels involved in filter on/off decision and strong/weak filter selection.

FIG. 9 shows examples of pixels involved in filter on/off decision and strong/weak filter selection.

Wider-stronger luma filter is filters are used only if all of three conditions are satisfied.

2.4.4. Stronger Deblocking Filter for Luma (Designed for Larger Blocks)

Bilinear filter is used when samples at either one side of a boundary belong to a large block. A sample belonging to a large block is defined as when the width≥32 for a vertical edge, and when height≥32 for a horizontal edge.

The bilinear filter is listed below.

Block boundary samples $p_i$ for i=0 to Sp-1 and $q_i$ for j=0 to Sq-1 (pi and qi are the i-th sample within a row for filtering vertical edge, or the i-th sample within a column for filtering horizontal edge) in HEVC deblocking described above) are then replaced by linear interpolation as follows:

$$p_i'=(f_i*\text{Middle}_{s,t}+(64-f_i)*P_s+32)>>6), \text{clipped to } p_i \pm \text{tcPD}_i$$

$$q_j'=(g_j*\text{Middle}_{s,t}+(64-g_j)*Q_s+32)>>6), \text{clipped to } q_j \pm \text{tcPD}_j$$

where $\text{tcPD}_i$ and $\text{tcPD}_j$ term is a position dependent clipping described in Section 2.4.7 and $g_j$, $f_i$, $\text{Middle}_{s,t}$, $P_s$ and $Q_s$ are given below:

2.4.5. Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition:
d is then derived as in HEVC luma deblocking.
The second condition will be TRUE when d is less than β.
In the third condition StrongFilterCondition is derived as follows:

dpq is derived as in HEVC.
$sp_3=\text{Abs}(p_3-p_0)$, derived as in HEVC
$sq_3=\text{Abs}(q_0-q_3)$, derived as in HEVC As in HEVC design, StrongFilterCondition=(dpq is less than ((β>>2), $sp_3+sq_3$ is less than (β>>3), and $\text{Abs}(p_0-q_0)$ is less than $(5*t_C+1)>>1$)

2.4.6. Strong Deblocking Filter for Chroma

The following strong deblocking filter for chroma is defined:

$$p_2'=(3*p_3+2*p_2+p_1+p_0+q_0+4)>>3$$

$$p_1'=(2*p_3+p_2+2*p_1+p_0+q_0+q_1+4)>>3$$

$$p_0'=(p_3+p_2+p_1+2*p_0+q_0+q_1+q_2+4)>>3$$

The proposed chroma filter performs deblocking on a 4×4 chroma sample grid.

2.4.7. Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.4.2, position dependent threshold table is selected from two tables (i.e., Tc7 and Tc3 tabulated below) that are provided to decoder as a side information:

2.4.8. Sub-block Deblocking Adjustment

To enable parallel friendly deblocking using both long filters and sub-block deblocking the long filters is restricted to modify at most 5 samples on a side that uses sub-block deblocking (e.g., AFFINE, ATMVP, or decoder-side motion vector refinement (DMVR)) as shown in the luma control for long filters. Additionally, the sub-block deblocking is adjusted such that that sub-block boundaries on an 8×8 grid that are close to a CU or an implicit TU boundary is restricted to modify at most two samples on each side.

2.5. Sample Adaptive Offset (SAO)

The input of SAO is the reconstructed samples after DB. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 10:
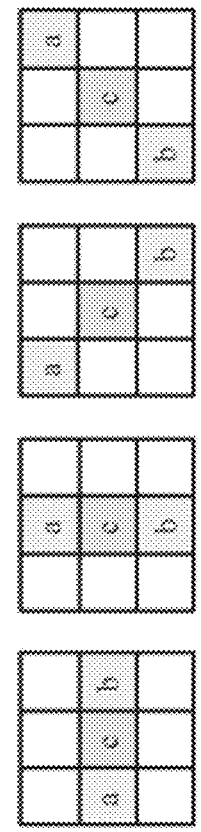
FIG. 10 shows examples of four one-dimensional (1-D) directional patterns for EO sample classification: horizontal (EO class=0), vertical (EO class=1), 135° diagonal (EO class=2), and 45° diagonal (EO class=3).

FIG. 10 shows examples of four 1-D directional patterns for EO sample classification: horizontal (EO class=0), vertical (EO class=1), 135° diagonal (EO class=2), and 45° diagonal (EO class=3).

For a given EO class, each sample inside the CTB is classified into one of five categories. The current sample value, labeled as "c," is compared with its two neighbors (labeled as "a" and "b") along the selected 1-D pattern. The classification rules for each sample are summarized in Table. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 4

Sample Classification Rules for Edge Offset

| Category | Condition |
|---|---|
| 1 | c < a and c < b |
| 2 | ( c < a && c = = b) || (c = = a && c < b) |

TABLE 4-continued

Sample Classification Rules for Edge Offset

| Category | Condition |
|---|---|
| 3 | ( c > a && c = = b) \|\| (c = = a && c > b) |
| 4 | c > a && c > b |
| 5 | None of above |

2.6. Adaptive Loop Filter (ALF)

In VVC, an Adaptive Loop Filter (ALF) with block-based filter adaption is applied. For the luma component, one among 25 filters is selected for each 4×4 block, based on the direction and activity of local gradients.

2.6.1. Filter Shape

Figure 11:
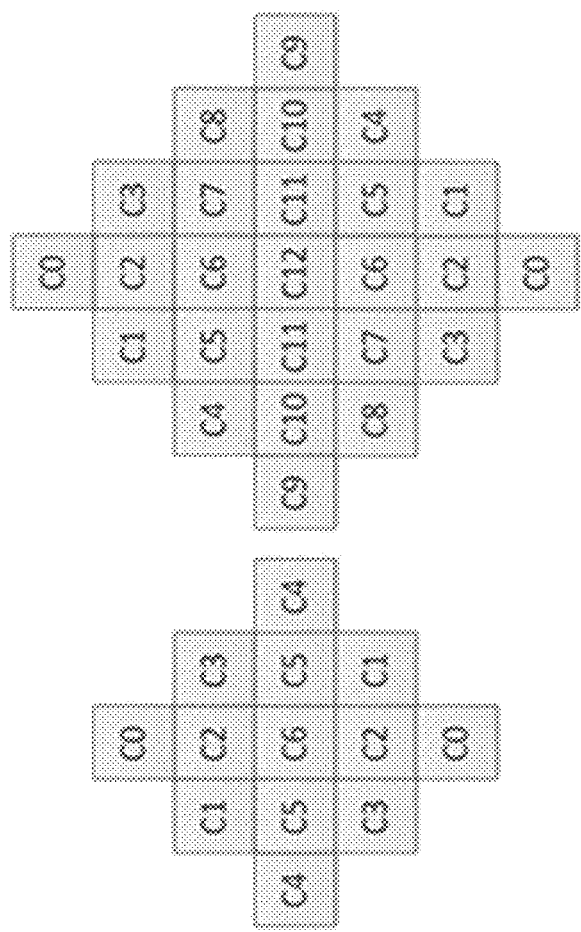
FIG. 11 shows examples of ALF filter shapes (chroma: 5×5 diamond, luma: 7×7 diamond).

Two diamond filter shapes (as shown in FIG. 11) are used. The 7×7 diamond shape is applied for luma component and the 5×5 diamond shape is applied for chroma components.

2.6.2. Block Classification

For luma component, each 4×4 block is categorized into one out of 25 classes. The classification index C is derived based on its directionality D and a quantized value of activity $\hat{A}$, as follows:

$$C = 5D + \hat{A} \quad (2\text{-}1)$$

To calculate D and $\hat{A}$, gradients of the horizontal, vertical and two diagonal direction are first calculated using 1-D Laplacian:

$$g_v = \Sigma_{k=i-2}^{i+3} \Sigma_{l=j-2}^{j+3} V_{k,l}, V_{k,l} = |2R(k,l) - R(k,l-1) - R(k,l+1)| \quad (2\text{-}2)$$

$$g_h = \Sigma_{k=i-2}^{i+3} \Sigma_{l=j-2}^{j+3} H_{k,l}, H_{k,l} = |2R(k,l) - R(k-1,l) - R(k+1,l)| \quad (2\text{-}3)$$

$$g_{d1} = \Sigma_{k=i-2}^{i+3} \Sigma_{l=j-2}^{j+3} D1_{k,l}, D1_{k,l} = |2R(k,l) - R(k-1,l-1) - R(k+1,l+1)| \quad (2\text{-}4)$$

$$g_{d2} = \Sigma_{k=i-2}^{i+3} \Sigma_{j=j-2}^{j+3} D2_{k,l}, D2_{k,l} = |2R(k,l) - R(k-1,l+1) - R(k+1,l-1)| \quad (2\text{-}5)$$

Where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIGS. 12A-12D the same subsampled positions are used for gradient calculation of all directions.

Figures 12A, 12B, 12C, 12D:
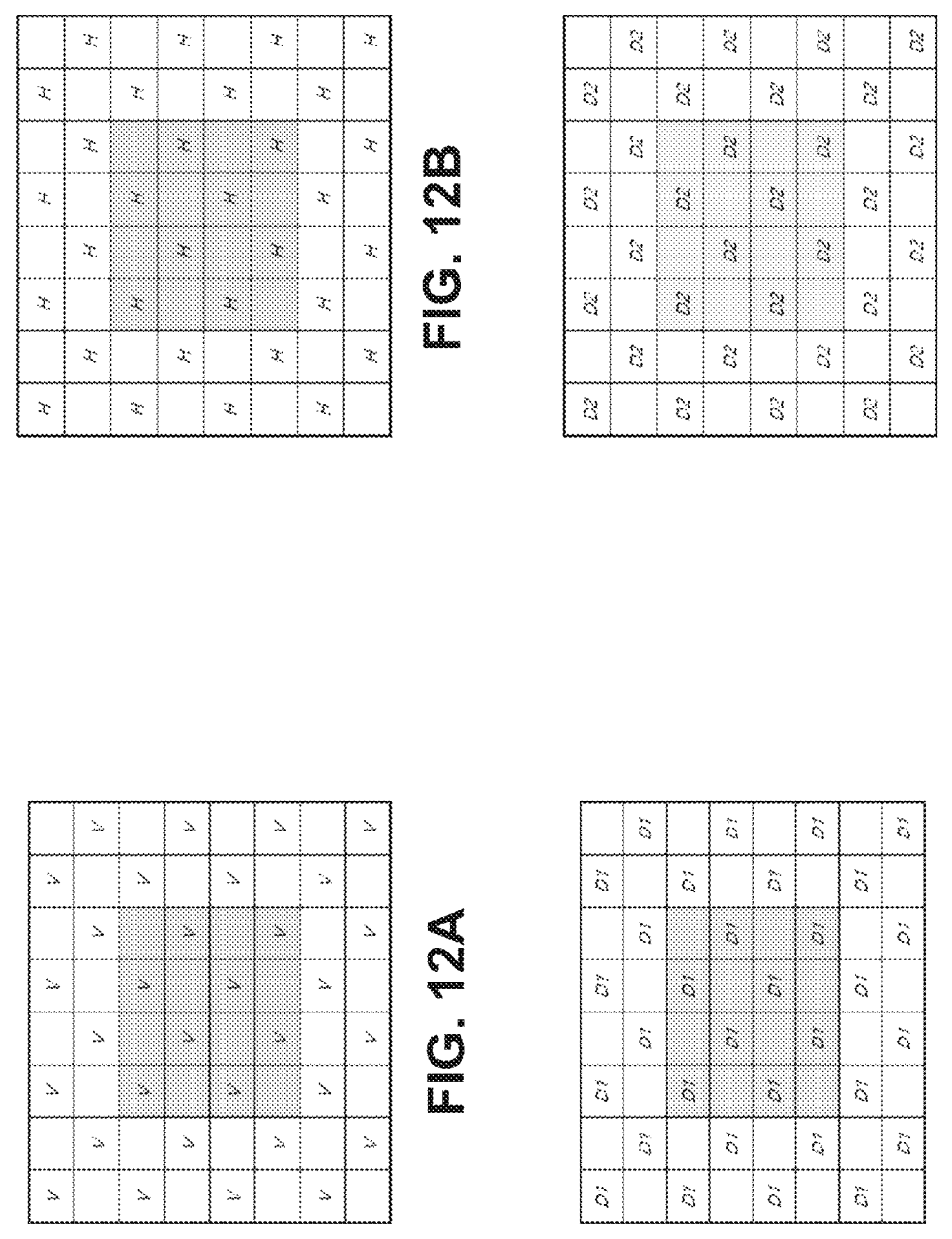

FIGS. 12A-12D show examples of subsampled Laplacian calculation. FIG. 12A shows subsampled positions for vertical gradient. FIG. 12B shows Subsampled positions for horizontal gradient. FIG. 12C shows Subsampled positions for diagonal gradient. FIG. 12D shows Subsampled positions for diagonal gradient.

Then D maximum and minimum values of the gradients of horizontal and vertical directions are set as:

$$g_{h,v}^{max} = \max(g_h, g_v), g_{h,v}^{min} = \min(g_h, g_v) \quad (2\text{-}6)$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \quad (2\text{-}7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \Sigma_{k=i-2}^{i+3} \Sigma_{l=j-2}^{j+3} (V_{k,l} + H_{k,l}) \quad (2\text{-}8)$$

A is further quantized to the range of 0 to 4, inclusively, and the quantized value is denoted as $\hat{A}$.

For chroma components in a picture, no classification method is applied, i.e. a single set of ALF coefficients is applied for each chroma component.

2.6.3. Geometric Transformations of Filter Coefficients and Clipping Values

Before filtering each 4×4 luma block, geometric transformations such as rotation or diagonal and vertical flipping are applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k,l) = f(l,k), c_D(k,l) = c(l,k), \quad (2\text{-}9)$$

$$\text{Vertical flip: } f_V(k,l) = f(k, K-l-1), c_V(k,l) = c(k, K-l-1) \quad (2\text{-}10)$$

$$\text{Rotation: } f_R(k,l) = f(K-l-1, k), c_R(k,l) = c(K-l-1, k) \quad (2\text{-}11)$$

where K is the size of the filter and $0 \leq k, l \leq K-1$ are coefficients coordinates, such that location (0,0) is at the upper left corner and location (K-1, K-1) is at the lower right corner. The transformations are applied to the filter coefficients f(k,l) and to the clipping values c(k,l) depending on gradient values calculated for that block. The relationship between the transformation and the four gradients of the four directions are summarized in the following table.

TABLE 5

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.6.4. Filter Parameters Signalling

ALF filter parameters are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a table of clipping values for both luma and Chroma components. These clipping values are dependent of the internal bitdepth. More precisely, the clipping values are obtained by the following formula:

$$\text{AlfClip} = \{\text{round}(2^{B-\alpha*n}) \text{ for } n \in [0 \ldots N-1]\} \quad (2\text{-}12)$$

with B equal to the internal bitdepth, α is a pre-defined constant value equal to 2.35, and N equal to 4 which is the number of allowed clipping values in VVC.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chroma filter set in the APS.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

2.6.5. Filtering Process

At decoder side, when ALF is enabled for a CTB, each sample R(i,j) within the CU is filtered, resulting in sample value R'(i,j) as shown below, $$R'(i,j)=R(i,j)+((\Sigma_{k\neq 0}\Sigma_{l\neq 0}f(k,l)\times K(R(i+k,j+l)-R(i,j),c(k,l))+64)>>7) \quad (2\text{-}13)$$

where f(k,l) denotes the decoded filter coefficients, K(x, y) is the clipping function and c(k,l) denotes the decoded clipping parameters. The variable k and l vary between $-L/2$ and $L/2$ where L denotes the filter length. The clipping function K(x, y)=min(y, max(−y, x)) which corresponds to the function Clip3 (−y, y, x).

2.6.6. Virtual Boundary Filtering Process for Line Buffer Reduction

In hardware and embedded software, picture-based processing is practically unacceptable due to its high picture buffer requirement. Using on-chip picture buffers is very expensive and using off-chip picture buffers significantly increases external memory access, power consumption, and data access latency. Therefore, DF, SAO, and ALF will be changed from picture-based to LCU-based decoding in real products. When LCU-based processing is used for DF, SAO, and ALF, the entire decoding process can be done LCU by LCU in a raster scan with an LCU-pipelining fashion for parallel processing of multiple LCUs. In this case, line buffers are required for DF, SAO, and ALF because processing one LCU row requires pixels from the above LCU row. If off-chip line buffers (e.g., dynamic random-access memory (DRAM)) are used, the external memory bandwidth and power consumption will be increased; if on-chip line buffers (e.g., static random-access memory (SRAM)) are used, the chip area will be increased. Therefore, although line buffers are already much smaller than picture buffers, it is still desirable to reduce line buffers.

Figure 13:
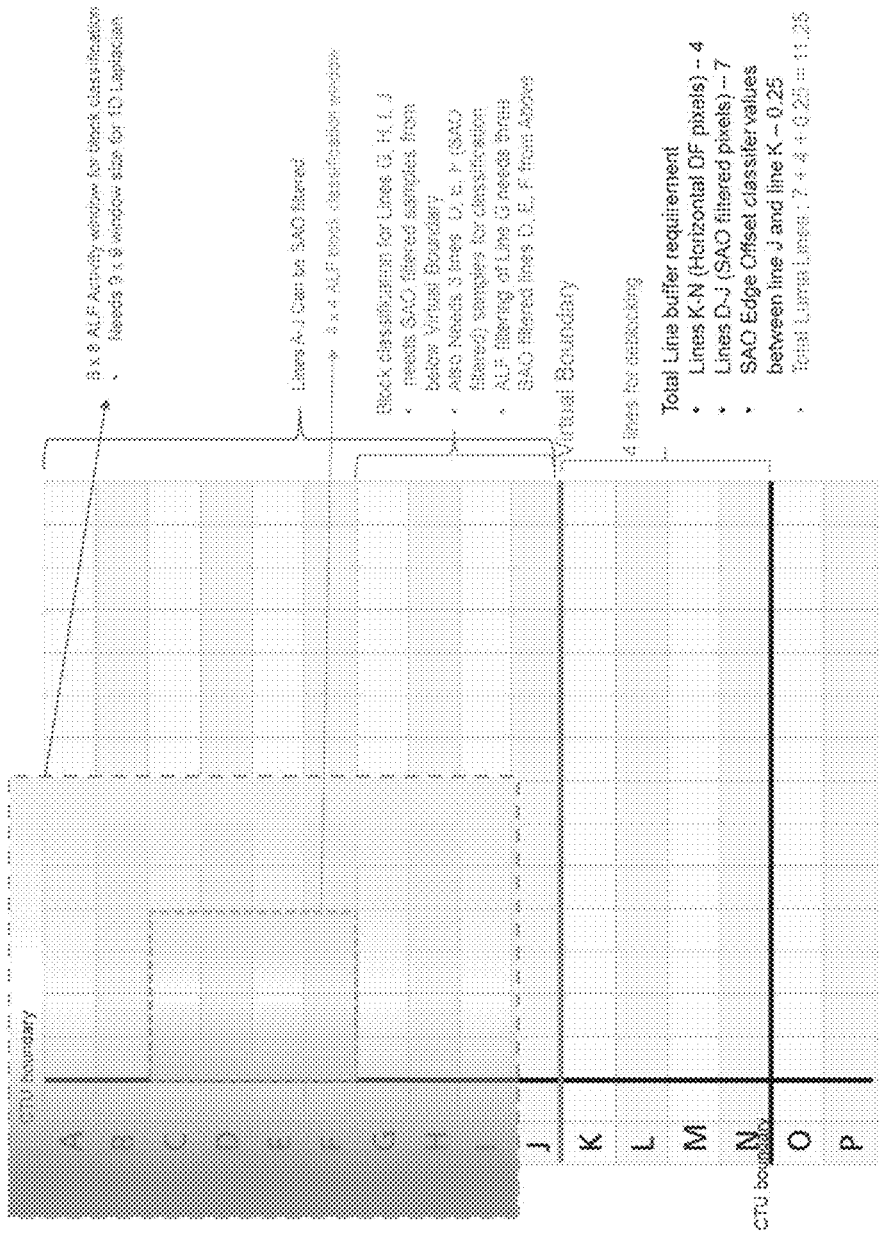
FIG. 13 shows a filter line buffer requirement in versatile video coding (VVC) test model (VTM)-4.0 for Luma component.

In VTM-4.0, as shown in FIG. 13, the total number of line buffers required is 11.25 lines for the Luma component. The explanation of the line buffer requirement is as follows: the deblocking of horizontal edge overlapping with CTU edge cannot be performed as the decisions and filtering require lines K, L, M, M from the first CTU and Lines O, P from the bottom CTU. Therefore, the deblocking of the horizontal edges overlapping with the CTU boundary is postponed until the lower CTU comes. Therefore, for the lines K, L, M, N reconstructed luma samples have to be stored in the line buffer (4 lines). Then the SAO filtering can be performed for lines A till J. The line J can be SAO filtered as deblocking does not change the samples in line K. For SAO filtering of line K, the edge offset classification decision is only stored in the line buffer (which is 0.25 Luma lines). The ALF filtering can only be performed for lines A-F. As shown in FIG. 13, the ALF classification is performed for each 4×4 block. Each 4×4 block classification needs an activity window of size 8×8 which in turn needs a 9×9 window to compute the 1-D Laplacian to determine the gradient.

Figure 14:
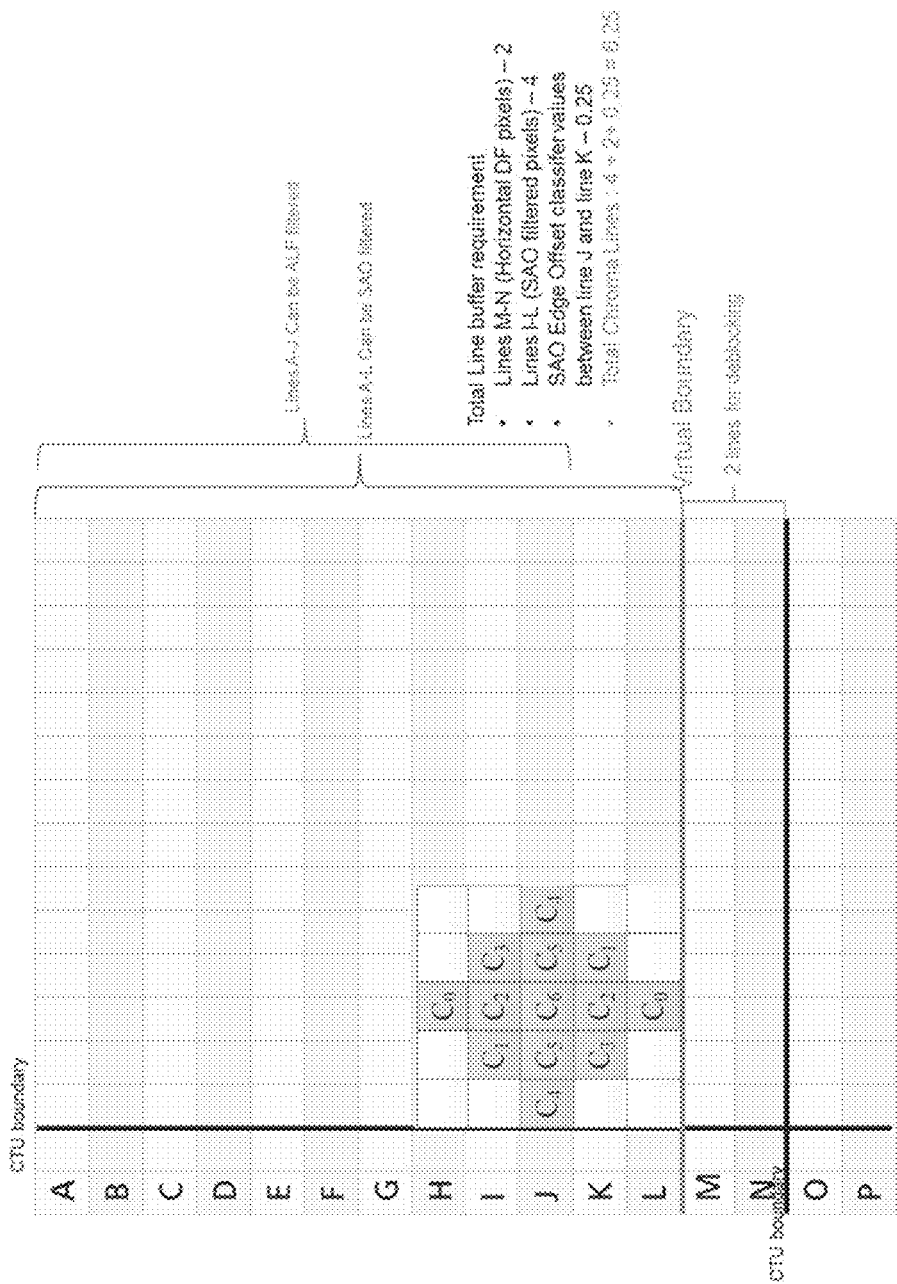
FIG. 14 shows a filter line buffer requirement in VTM-4.0 for Chroma component.

Therefore, for the block classification of the 4×4 block overlapping with lines G, H, I, J needs, SAO filtered samples below the Virtual boundary. In addition, the SAO filtered samples of lines D, E, F are required for ALF classification. Moreover, the ALF filtering of Line G needs three SAO filtered lines D, E, F from above lines. Therefore, the total line buffer requirement is as follows:

Lines K-N (Horizontal DF pixels): 4 lines
Lines D-J (SAO filtered pixels): 7 lines
SAO Edge offset classifier values between line J and line K: 0.25 line Therefore, the total number of luma lines required is 7+4+0.25=11.25. Similarly, the line buffer requirement of the Chroma component is illustrated in FIG. 14. The line buffer requirement for Chroma component is evaluated to be 6.25 lines.

FIG. 13 shows a filter line buffer requirement in VTM-4.0 for Luma component.

FIG. 14 shows a filter line buffer requirement in VTM-4.0 for Chroma component.

In order to eliminate the line buffer requirements of SAO and ALF, the concept of virtual boundary (VB) is introduced to reduce the line buffer requirement of ALF in the latest VVC. Modified block classification and filtering are employed for the samples near horizontal CTU boundaries. As shown in FIG. 13, VBs are upward shifted horizontal LCU boundaries by N pixels. For each LCU, SAO and ALF can process pixels above the VB before the lower LCU comes but cannot process pixels below the VB until the lower LCU comes, which is caused by DF. With consideration of the hardware implementation cost, the space between the proposed VB and the horizontal LCU boundary is set as four pixels for luma component (i.e. N=4 in FIG. 13 or FIG. 15) and two pixels for chroma component (i.e. N=2).

Figure 15:
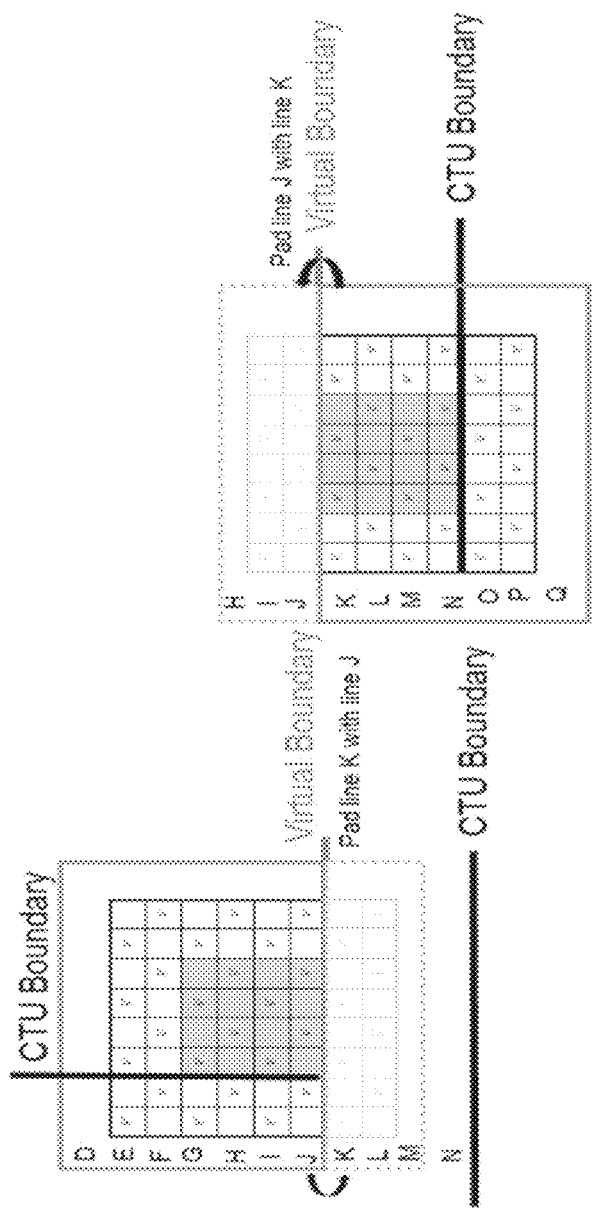
FIG. 15 shows an example of a modified block classification at virtual boundaries.

FIG. 15 shows an example of a modified block classification at virtual boundaries.

Figure 16:
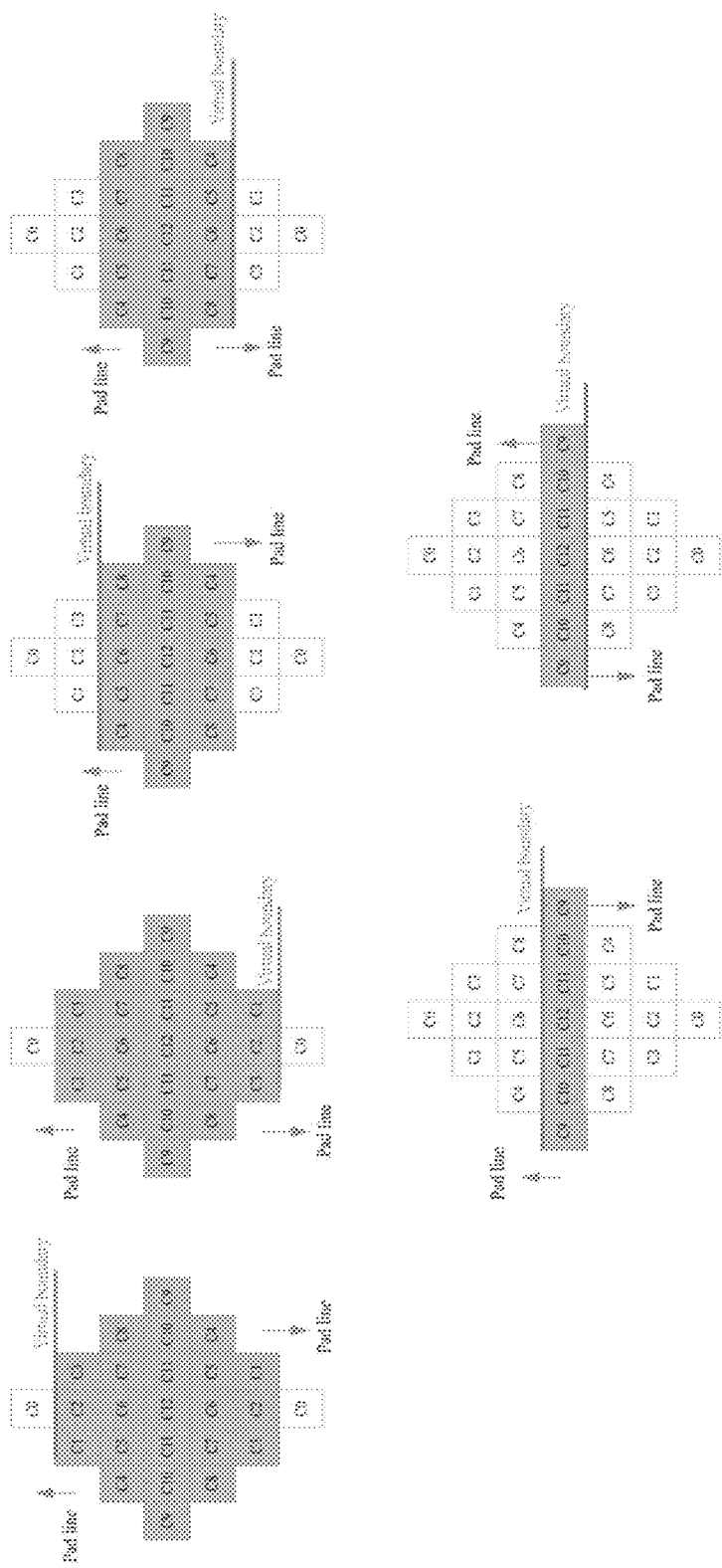
FIG. 16 shows an example of modified ALF filtering for Luma component at virtual boundaries.

Modified block classification is applied for the Luma component as depicted in FIG. 16. For the 1-D Laplacian gradient calculation of the 4×4 block above the virtual boundary, only the samples above the virtual boundary are used. Similarly, for the 1-D Laplacian gradient calculation of the 4×4 block below the virtual boundary, only the samples below the virtual boundary are used. The quantization of activity value A is accordingly scaled by taking into account the reduced number of samples used in 1-D Laplacian gradient calculation.

For filtering processing, mirrored (symmetric) padding operation at the virtual boundaries are used for both Luma and Chroma components. As shown in FIG. 16, when the sample being filtered is located below the virtual boundary, the neighboring samples that are located above the virtual boundary are padded. Meanwhile, the corresponding samples at the other sides are also padded, symmetrically.

Figure 17A:
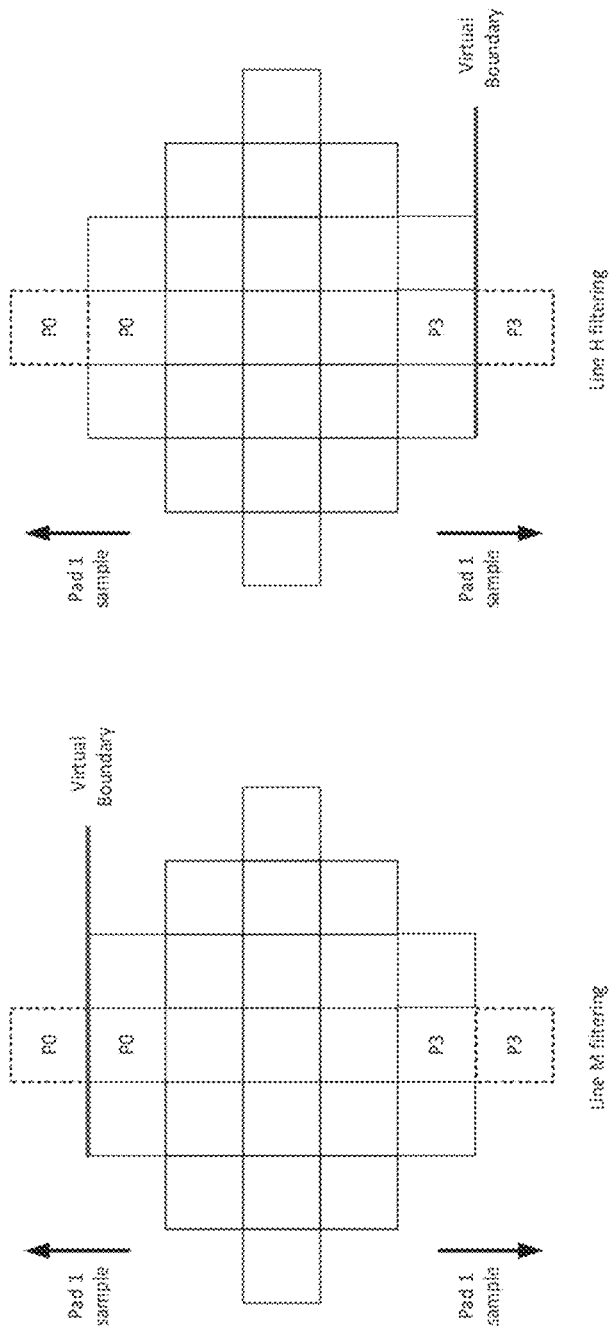
FIG. 17A shows an example of modified luma ALF filtering at virtual boundary.
Figure 17B:
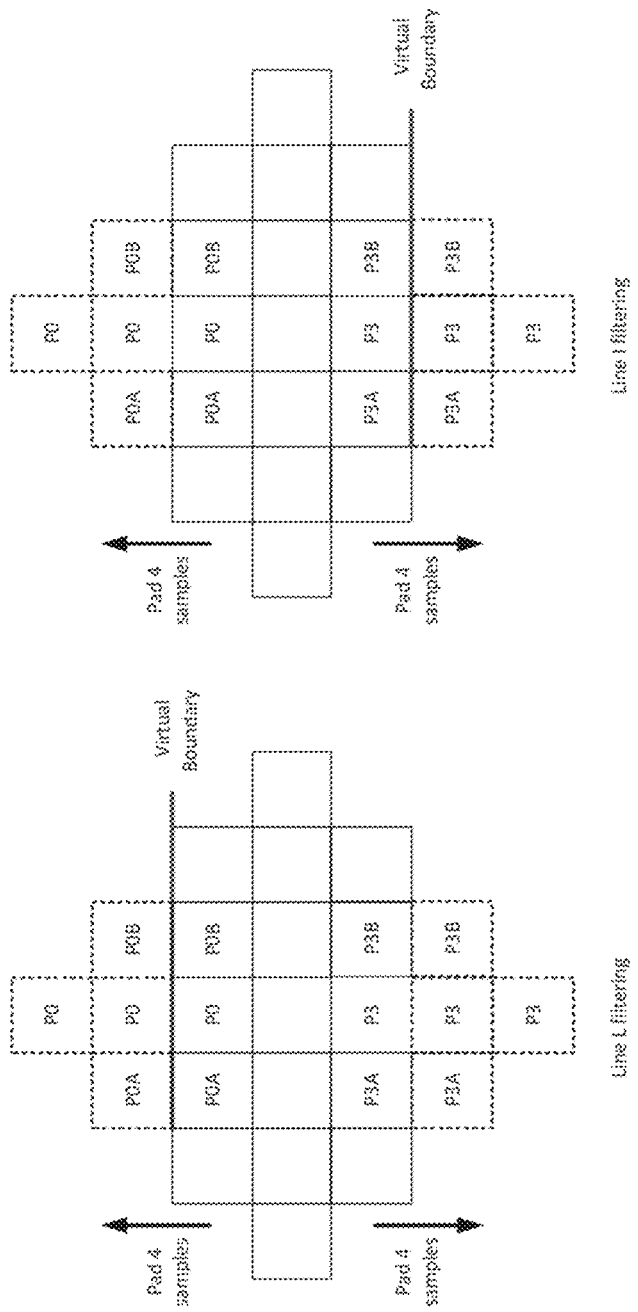
FIG. 17B shows another example of modified luma ALF filtering at virtual boundary.
Figure 17C:
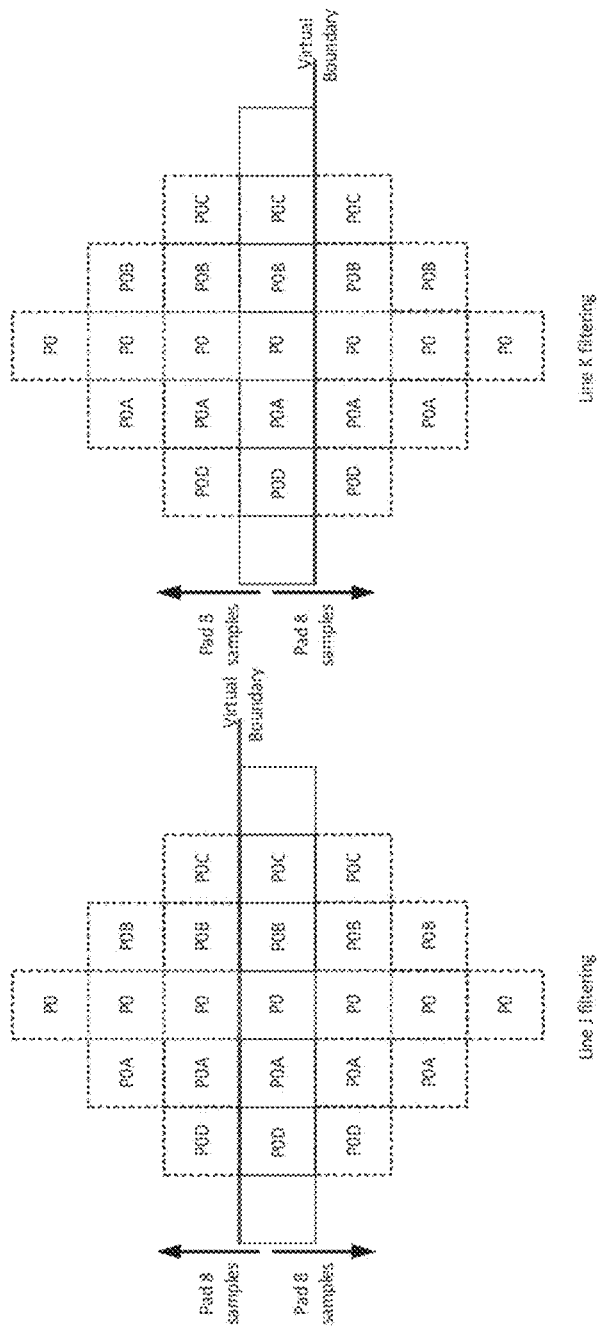
FIG. 17C shows yet another example of modified luma ALF filtering at virtual boundary.

For another example, if one sample located at (i, j) (e.g., the P0A with dash line in FIG. 17B is padded, then the corresponding sample located at (m, n) (e.g., the P3B with dash line in FIG. 17B which share the same filter coefficient is also padded even the sample is available, as depicted in FIGS. 17A-17C.

FIGS. 17A-C show modified luma ALF filtering at virtual boundary examples. FIG. 17A shows one required line above/below VB need to be padded (per side), FIG. 17B shows 2 required lines above/below VB need to be padded (per side), and FIG. 17C shows 3 required lines above/below VB need to be padded (per side).

Figure 18:
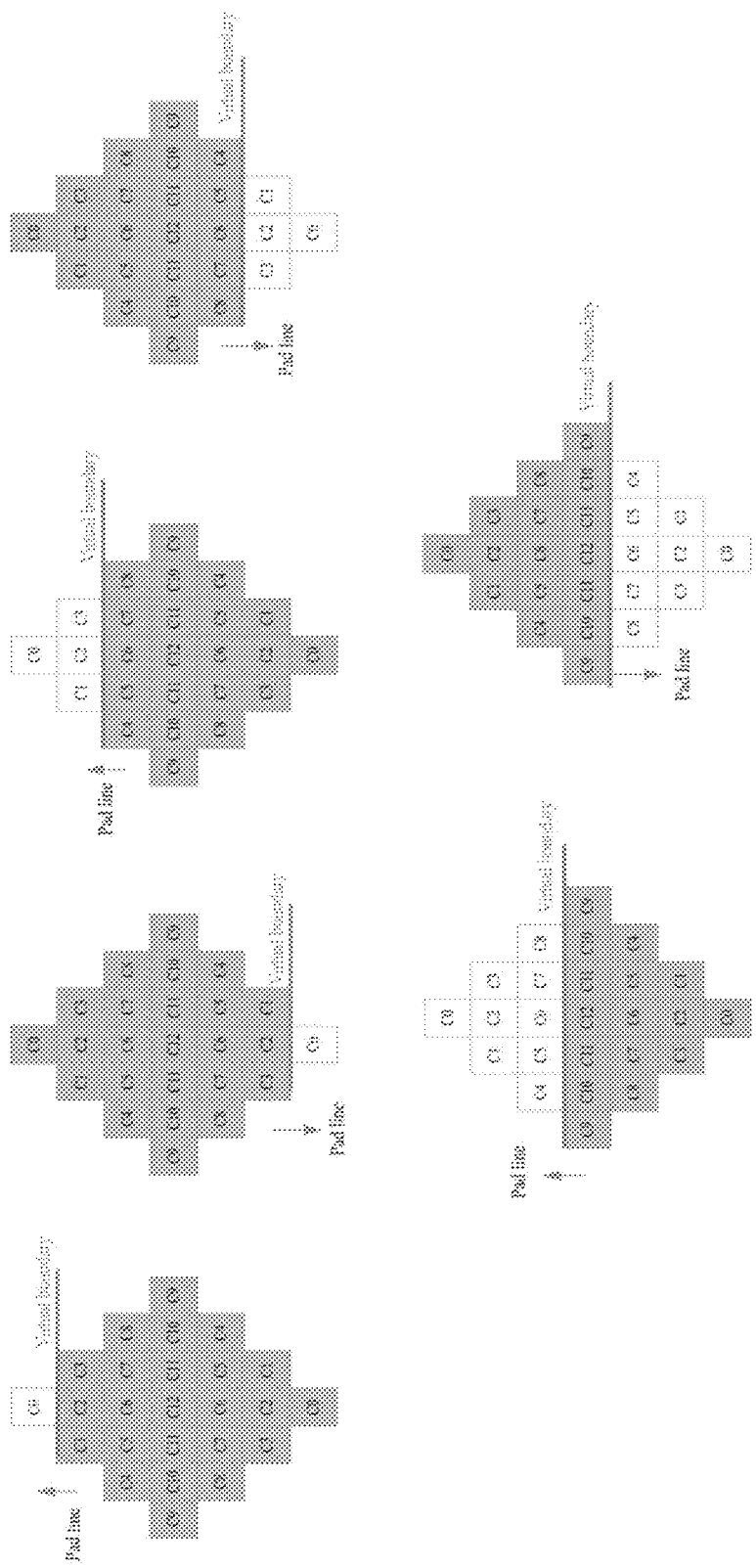
FIG. 18 shows examples of repetitive padding for luma ALF filtering at picture/subpicture/slice/tile boundary.

Different to the mirrored (symmetric) padding method used at horizontal CTU boundaries, repetitive (one-side) padding process is applied for slice, tile, and subpicture boundaries when filter across the boundaries is disabled. The repetitive (one-side) padding process is also applied at picture boundary. The padded samples are used for both classification and filtering process. FIG. 18 depicts an example of repetitive padding method for luma ALF filtering at picture/subpicture/slice/tile boundary.

FIG. 18 shows examples of repetitive padding for luma ALF filtering at picture/subpicture/slice/tile boundary.

2.7. ALF VB with Modified Filter Strength

ALF virtual boundary processing avoids increasing the size of the line buffers for adaptive loop filtering. This contribution claims that this processing, in some cases, can introduce visual artifacts due to the use of extreme padding for the closest row on each side of the virtual horizontal CTU boundary without compensating the filter strength for that. To solve this issue, the filter strength is reduced by increasing the right shift for ALF filtering of the rows adjacent to the virtual horizontal CTU boundary.

More specifically, the filter strength for both luma and chroma when filtering rows adjacent to the ALF virtual boundary is reduced. The deletions are marked as [[ ]] and the corresponding specification additions are highlighted in boldface italic underlined as follows:

8.8.5.2 Coding Tree Block Filtering Process for Luma Samples

Inputs of this process are:
  a reconstructed luma picture sample array recPicture prior to the adaptive loop filtering process,
  a filtered reconstructed luma picture sample array alfPicture$_L$,
  a luma location (xCtb, yCtb) specifying the top-left sample of the current luma coding tree block relative to the top left sample of the current picture.

Output of this process is the modified filtered reconstructed luma picture sample array alfPicture$_L$.

The derivation process for filter index clause 8.8.5.3 is invoked with the location (xCtb, yCtb) and the reconstructed luma picture sample array recPicture as inputs, and filtIdx[x][y] and transposeIdx[x][y] with x, y=0 ... CtbSizeY-1 as outputs.

For the derivation of the filtered reconstructed luma samples alfPicture$_L$[x][y], each reconstructed luma sample inside the current luma coding tree block recPicture[x][y] is filtered as follows with x, y=0 ... CtbSizeY-1:

The array of luma filter coefficients f[j] and the array of luma clipping values c[j] corresponding to the filter specified by filtIdx[x][y] is derived as follows with j= 0 ... 11:

The variable sum is derived as follows:

$$\text{sum}=f[\text{idx}[0]]*(\text{Clip3}(-c[\text{idx}[0]],c[\text{idx}[0]],\text{recPicture}[h_x][v_{y+y3}]-\text{curr})+\text{Clip3}(-c[\text{idx}[0]],c[\text{idx}[0]],$$
$$\text{recPicture}[h_x][v_{y-y3}]-\text{curr}))+f[\text{idx}[1]]*(\text{Clip3}(-c[\text{idx}[1]],c[\text{idx}[1]],\text{recPicture}[h_{x+1}][v_{y-y2}]-\text{curr})+$$
$$\text{Clip3}(-c[\text{idx}[1]],c[\text{idx}[1]],\text{recPicture}[h_{x-1}][v_{y-y2}]-\text{curr}))+f[\text{idx}[2]]*(\text{Clip3}(-c[\text{idx}[2]],c[\text{idx}$$
$$[2]],\text{recPicture}[h_x][v_{y+y2}]-\text{curr})+\text{Clip3}(-c[\text{idx}[2]],c[\text{idx}[2]],\text{recPicture}[h_x][v_{y-y2}]-\text{curr}))+f[\text{idx}[3]]*(\text{Clip3}(-c[\text{idx}[3]],c[\text{idx}[3]],\text{recPicture}[h_{x-1}][v_{y+y2}]-\text{curr})+\text{Clip3}(-c[\text{idx}[3]],c[\text{idx}[3]],\text{recPicture}[h_{x+1}][v_{y-y2}]-\text{curr}))+f[\text{idx}[4]]*(\text{Clip3}(-c[\text{idx}[4]],c[\text{idx}[4]],\text{recPicture}[h_{x+2}][v_{y+y1}]-\text{curr})+\text{Clip3}(-c[\text{idx}[4]],c[\text{idx}[4]],\text{recPicture}[h_{x-2}][v_{y-y1}]-\text{curr}))+f[\text{idx}[5]]*(\text{Clip3}(-c[\text{idx}[5]],c[\text{idx}[5]],\text{recPicture}[h_{x+1}][v_{y+y1}]-\text{curr})+\text{Clip3}(-c[\text{idx}[5]],c[\text{idx}[5]],\text{recPicture}[h_{x+1}][v_y]-\text{curr}))+f[\text{idx}[6]]*(\text{Clip3}(-c[\text{idx}[6]],c[\text{idx}[6]],\text{recPicture}[h_x][v_{y+y1}]-\text{curr})+\text{Clip3}(-c[\text{idx}[6]],c[\text{idx}[6]],\text{recPicture}[h_x][v_y]-\text{curr}))+f[\text{idx}[7]]*(\text{Clip3}(-c[\text{idx}[7]],c[\text{idx}[7]],\text{recPicture}[h_{x-1}][v_{y+y1}]-\text{curr})+\text{Clip3}(-c[\text{idx}[7]],c[\text{idx}[7]],\text{recPicture}[h_{x+1}][v_{y-y1}]-\text{curr}))+f[\text{idx}[8]]*(\text{Clip3}(-c[\text{idx}[8]],c[\text{idx}[8]],\text{recPicture}[h_{x-2}][v_{y+y1}]-\text{curr})+\text{Clip3}(-c[\text{idx}[8]],c[\text{idx}[8]],\text{recPicture}[h_{x+2}][v_{y-y1}]-\text{curr}))+f[\text{idx}[9]]*(\text{Clip3}(-c[\text{idx}[9]],c[\text{idx}[9]],\text{recPicture}[h_{x+3}][v_y]-\text{curr})+\text{Clip3}(-c[\text{idx}[9]],c[\text{idx}[9]],\text{recPicture}[h_{x+3}][v_y]-\text{curr}))+f[\text{idx}[10]]*(\text{Clip3}(-c[\text{idx}[10]],c[\text{idx}[10]],\text{recPicture}[h_{x+2}][v_y]-\text{curr})+\text{Clip3}(-c[\text{idx}[10]],c[\text{idx}[10]],\text{recPicture}[h_{x-2}][v_y]-\text{curr}))+f[\text{idx}[11]]*(\text{Clip3}(-c[\text{idx}[11]],c[\text{idx}[11]],\text{recPicture}[h_{x+1}][v_y]-\text{curr})+\text{Clip3}(-c[\text{idx}[11]],c[\text{idx}[11]],\text{recPicture}[h_{x-1}][v_y]-\text{curr})) \quad (1423)$$

$$\text{sum}=\text{curr}+((\text{sum}+64)>>\boldsymbol{\underline{\mathit{alfShiftY}}}) \quad (1424)$$

TABLE 43

Specification of y1, y2, y3 and alfShiftY according to the vertical luma sample position y and applyAlfLineBufBoundary

| Condition | alfShiftY | y1 | y2 | y3 |
|---|---|---|---|---|
| (y == CtbSizeY − 5 y == CtbSizeY − 4 ) && ( applyAlfLineBufBoundary == 1) | _10_ | 0 | 0 | 0 |
| (y == CtbSizeY − 6 y == CtbSizeY − 3 ) && ( applyAlfLineBufBoundary == 1) | _7_ | 1 | 1 | 1 |
| (y == CtbSizeY − 7 y == CtbSizeY − 2 ) && ( applyAlfLineBufBoundary == 1) | _7_ | 1 | 2 | 2 |
| Otherwise | _7_ | 1 | 2 | 3 |

8.8.5.4 Coding Tree Block Filtering Process for Chroma Samples

Inputs of this process are:
  a reconstructed chroma picture sample array recPicture prior to the adaptive loop filtering process,
  a filtered reconstructed chroma picture sample array alfPicture,
  a chroma location (xCtbC, yCtbC) specifying the top-left sample of the current chroma coding tree block relative to the top left sample of the current picture,
  an alternative chroma filter index altIdx.

Output of this process is the modified filtered reconstructed chroma picture sample array alfPicture.

The width and height of the current chroma coding tree block ctbWidthC and ctbHeightC is derived as follows:

For the derivation of the filtered reconstructed chroma samples alfPicture[x][y], each reconstructed chroma sample inside the current chroma coding tree block recPicture[x][y] is filtered as follows with x=0 ... ctbWidthC−1, y=0 ... ctbHeightC−1:

The locations ($h_{x+i}$, $v_{y+j}$) for each of the corresponding chroma samples (x, y) inside the given array recPicture of chroma samples with i, j=−2 ... 2 are derived as follows:

The variable sum is derived as follows:

$$\text{sum}=f[0]*(\text{Clip3}(-c[0],c[0],\text{recPicture}[h_x][v_{y+y2}]-\text{curr})+\text{Clip3}(-c[0],c[0],\text{recPicture}[h_x][v_{y-y2}]-\text{curr}))+f[1]*(\text{Clip3}(-c[1],c[1],\text{recPicture}[h_{x+1}][v_{y+y1}]-\text{curr})+\text{Clip3}(-c[1],c[1],\text{recPicture}[h_{x-1}][v_{y-y1}]-\text{curr}))+f[2]*(\text{Clip3}(-c[2],c[2],\text{recPicture}$$

$[h_x][v_{y+y1}]$–curr)+Clip3($-c[2],c[2]$,recPicture$[h_x]$
$[v_{y-y1}]$–curr))+$f[3]$*(Clip3($-c[3],c[3]$,recPicture
$[h_{x-}][v_{y+y1}]$–curr)+Clip3($-c[3],c[3]$,recPicture
$[h_{x+1}][v_{y-y1}]$–curr))+$f[4]$*(Clip3($-c[4],c[4]$,
recPicture$[h_{x+2}][v_y]$–curr)+Clip3($-c[4],c[4]$,
recPicture$[h_{x-2}][v_y]$–curr))+$f[5]$*(Clip3($-c[5],c$
$[5]$,recPicture$[h_{x+1}][v_y]$–curr)+Clip3($-c[5],c[5]$,
recPicture$[h_{x-1}][v_y]$–curr))    (1464)

sum=curr+((sum+64)>> alfShiftC)    (1466)

TABLE 44

Specification of y1, y2 and *alfShiftC* according to the vertical chroma sample position y and applyAlfLineBufBoundary

| Condition | alfShiftC | y1 | y2 |
|---|---|---|---|
| (y = = ctbHeightC − 2 ‖ y = = ctbHeightC − 3) && (applyAlfLineBufBoundary = = 1) | 10 | 0 | 0 |
| (y = = ctbHeightC − 1 ‖ y = = ctbHeightC − 4) && (applyAlfLineBufBoundary = = 1) | 7 | 1 | 1 |
| Otherwise | 7 | 1 | 2 |

2.8. Cross Component Adaptive Loop Filter

Figure 19B:
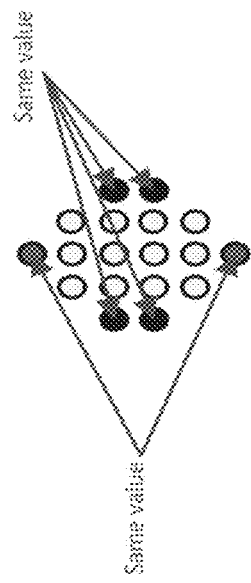
FIG. 19B shows an example of a 4×6 diamond shaped filter.
Figure 19A:
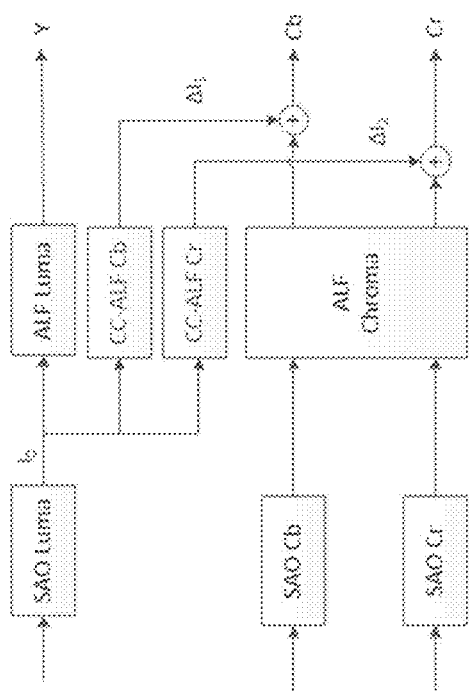
FIG. 19A shows example placement of CC-ALF with respect to other loop filters.

FIG. 19A illustrates the placement of CC-ALF with respect to the other loop filters. CC-ALF operates by applying a linear, diamond shaped filter (FIG. 19B) the luma channel for each chroma component, which is expressed as $$\Delta I_i(x, y) = \sum_{(x_0,y_0)\in S_i} I_0(x_C + x_0, y_C + y_0)c_i(x_0, y_0),$$

where (x, y) is chroma component i location being refined
($x_C$, $y_C$) is the luma location based on (x, y)
$S_i$ is filter support in luma for chroma component i
$c_i(x_0, y_0)$ represents the filter coefficients (2-14)

FIG. 19A shows example placement of CC-ALF with respect to other loop filters. FIG. 19B shows an example of 4×6 Diamond shaped filter.

The luma location ($x_C$, $y_C$), around which the support region is centered, is computed based on the spatial scaling factor between the luma and chroma planes. All filter coefficients are transmitted in the APS and have 8-bit dynamic range. An APS may be referenced in the slice header. CC-ALF coefficients used for each chroma component of a slice are also stored in a buffer corresponding to a temporal sublayer. Reuse of these sets of temporal sublayer filter coefficients is facilitated using slice-level flags. The application of the CC-ALF filters is controlled on a variable block size (i.e., 16×16, 32×32, 64×64, 128×128) and signalled by a context-coded flag received for each block of samples. The block size along with an CC-ALF enabling flag is received at the slice-level for each chroma component. Boundary padding for the horizontal virtual boundaries makes use of repetition. For the remaining boundaries the same type of padding is used as for regular ALF.

It is assumed that the sum of all CC-ALF filter coefficients is equal to 0. Therefore, in some embodiments, the filtering process is revised to be as follows:

$$\Delta I_i(x,y)=((\Sigma_{(x_0,y_0)\in S_i}(I_0(x_C+x_0,y_C+y_0)-I_0(x_{C_0},y_{C_0}))c_i(x_0,y_0))+64)>>7 \quad (2\text{-}15)$$

wherein $I_0(x_{C_0}, y_{C_0})$ is the corresponding luma sample for a chroma sample to be filtered; and $(I_0(x_C+x_0, y_C+y_0)$ is the surrounding luma samples around the corresponding luma sample in the CC-ALF filter support. Meanwhile, the filter support is modified to be the 3×4 diamond shaped filter wherein the center one in the second row is marked as the corresponding luma sample.

Figure 20:
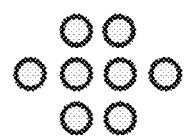
FIG. 20 shows an example of a 3×4 diamond shaped filter.

FIG. 20 shows an example of a 3×4 Diamond shaped filter.

2.8.1. Padding Method at Virtual Boundary

Figure 21:
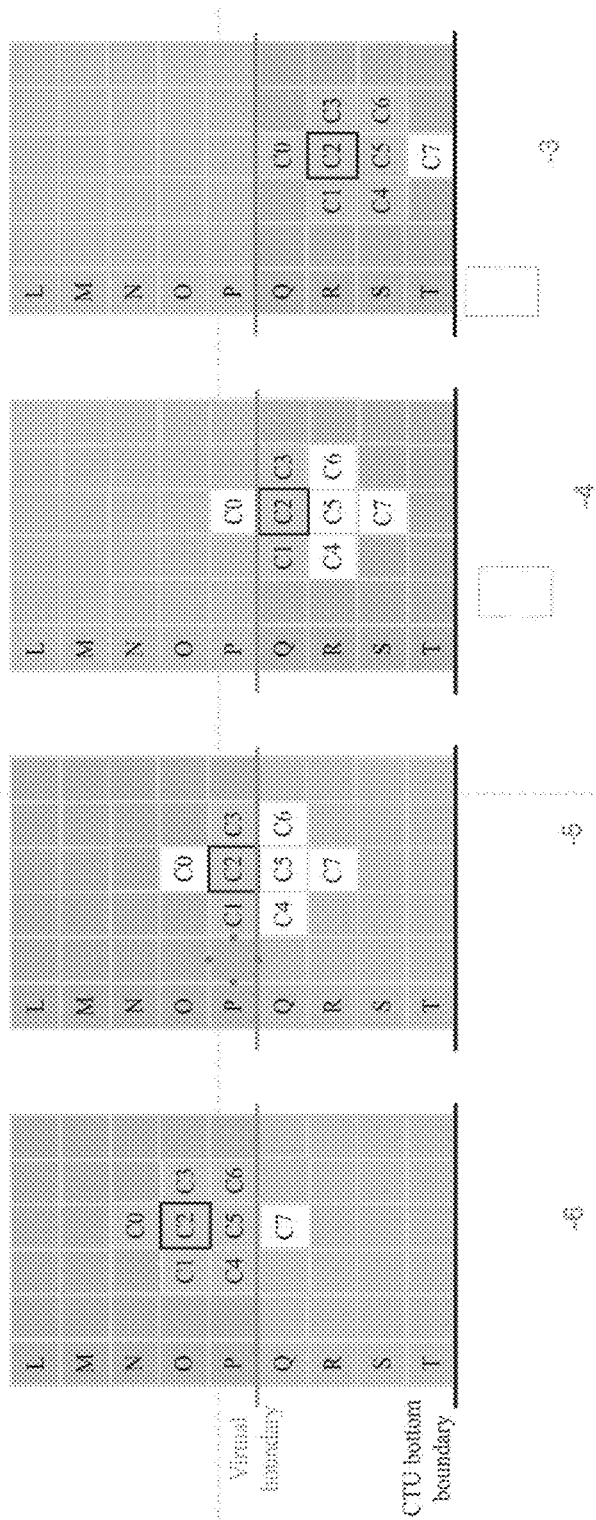
FIG. 21 shows an example of padding at ALF virtual boundary for CC-ALF for a chroma sample located as (x, y) and C2 represents the corresponding luma sample, white sample is the one to be padded.

Similar to luma ALF/chroma ALF, repetitive padding is utilized at ALF virtual boundary for CC-ALF in some embodiments. As shown in FIG. 21, if the luma samples above or below the ALF virtual boundary are unavailable, the nearest sample line is utilized for padding. Similar to the ALF design, mirror padding is applied.

The detailed filtering process is defined as follows, in the VVC specification:

8.8.5.7 Cross-Component Filtering Process
The variable sum is derived as follows:

sum=$f[0]$*(recPicture$_L[h_x][v_{y-yP1}]$–recPicture$_L[h_x]$
$[v_y])$+$f[1]$*(recPicture$_L[h_{x-}][v_y]$–recPicture$_L[h_x]$
$[v_y])$+$f[2]$*(recPicture$_L[h_{x+1}][v_y]$–recPicture$_L[h_x]$
$[v_y])$+$f[3]$*(recPicture$_L[h_{x-1}][v_{y+yP1}]$–recPicture$_L$
$[h_x][v_y])$+$f[4]$*(recPicture$_L[h_x][v_{y+yP1}]$–
recPicture$_L[h_x][v_y])$+$f[5]$*(recPicture$_L[h_{x+1}]$
$[v_{y+yP1}]$–recPicture$_L[h_x][v_y])$+$f[6]$*(recPicture$_L$
$[h_x][v_{y+yP2}]$–recPicture$_L[h_x][v_y])$    (1532)

scaledSum=Clip3(−(1<<(BitDepth−1)),(1<<(Bit-
Depth−1))−1,(sum+64)>>7)    (1533)

sum=curr+scaledSum    (1534)

The modified filtered reconstructed chroma picture sample ccAlfPicture[xCtbC+x][yCtbC+y] is derived as follows:

ccAlfPicture[xCtbC+x][yCtbC+y]=Clip3(0,(1<<Bit-
Depth)−1,sum)    (1535)

TABLE 47

Specification of yP1 and yP2 according to the vertical luma sample position (y * subHeightC) and applyAlfLineBufBoundary

| Condition | yP1 | yP2 |
|---|---|---|
| (y * subHeightC = = CtbSizeY − 5 ‖ y * subHeightC = = CtbSizeY − 4 ) && applyAlfLineBufBoundary = = 1 | 0 | 0 |
| (y * subHeightC = = CtbSizeY − 6 ‖ y * subHeightC = = CtbSizeY − 3 ) && applyAlfLineBufBoundary = = 1 | 1 | 1 |
| Otherwise | 1 | 2 |

(a) y * subHeightC = = CtbSizeY − 6;
(b) y * subHeightC = = CtbSizeY − 5;
(c) y * subHeightC = = CtbSizeY − 4;
(d) y * subHeightC = = CtbSizeY − 3

FIG. 21 shows an example of padding at ALF virtual boundary for CC-ALF for a chroma sample located as (x, y) and C2 represents the corresponding luma sample, white sample is the one to be padded.

2.8.2. Spec Changes Related to ALF VB Handling 8.8.5.7 Cross Component Filtering Process for Coding Tree Block of Chroma Samples Inputs of this process are:
  a reconstructed luma picture sample array recPicture$_L$ prior to the luma adaptive loop filtering process,
  a filtered reconstructed chroma picture sample array alfPicture$_C$,
  a chroma location (xCtbC, yCtbC) specifying the top-left sample of the current chroma coding tree block relative to the top left sample of the current picture, a luma location (xCtb, yCtb) specifying the top-left sample of the current luma coding tree block relative to the top left sample of the current picture a width ccAlfWidth of block of chroma samples a height ccAlfHeight of block of chroma samples cross component filter coefficients CcAlfCoeff[j], with j=0 . . . 6

Output of this process is the modified filtered reconstructed chroma picture sample array ccAlfPicture. For the derivation of the filtered reconstructed chroma samples ccAlfPicture[xCtbC+x][yCtbC+y], each reconstructed chroma sample inside the current chroma block of samples alfPicture$_C$[xCtbC+x][yCtbC+y] with x=0 . . . ccAlfWidth−1, y= 0 . . . ccAlfHeight−1, is filtered as follows:

The luma location (xL, yL) corresponding to the current chroma sample at chroma location (xCtbC+x, yCtbC+y) is set equal to ((xCtbC+x)*SubWidthC, (yCtbC+y)*SubHeightC)

The luma locations ($h_{x+i}$, $v_{y+j}$) with i=−1 . . . 1, j=−1 . . . 2 inside the array recPicture$_L$ are derived as follows:

$$h_{x+i} = \text{Clip3}(0, \text{pic\_width\_in\_luma\_samples}-1, xL+i) \quad (8\text{-}1231)$$

$$v_{y+j} = \text{Clip3}(0, \text{pic\_height\_in\_luma\_samples}-1, yL+j) \quad (8\text{-}1234)$$

The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) and (x*SubWidthC, y*SubHeightC) as inputs.

The variables $h_{x+i}$ and $v_{y+j}$ are modified by invoking the ALF sample padding process as specified in clause 8.8.5.6 with (xCtb, yCtb), ($h_{x+i}$, $v_{y+j}$), the variable is Chroma set equal to 0, clipLeftPos, clipRightPos, clipTopPos, clipBottomPos, clipTopLeftFlag and clipBotRightFlag as input.

The variable applyAlfLineBufBoundary is derived as follows:

If the bottom boundary of the current coding tree block is the bottom boundary of current picture and pic_height_in_luma_samples−yCtb≤CtbSizeY−4, applyAlfLineBufBoundary is set equal to 0:

Otherwise, applyAlfLineBufBoundary is set equal to 1.

The vertical sample position offsets yP1 and yP2 are specified in Table 44 according to the vertical luma sample position y*subHeightC and applyAlfLineBufBoundary.

The variable curr is derived as follows:

$$\text{curr} = \text{alfPicture}_C[xCtbC+x][yCtbC+y] \quad (8\text{-}1286)$$

The array of cross component filter coefficients f[j] is derived as follows with j=0 . . . 6:

$$f[j] = \text{CcAlfCoeff}[j] \quad (8\text{-}1287)$$

The variable sum is derived as follows:

$$\begin{aligned}\text{sum} = &f[0]*(\text{recPicture}_L[h_x][v_{y-yP1}]-\text{recPicture}_L[h_x]\\&[v_y])+f[1]*(\text{recPicture}_L[h_{x-1}][v_y]-\text{recPicture}_L[h_x]\\&[v_y])+f[2]*(\text{recPicture}_L[h_{x+1}][v_y]-\text{recPicture}_L[h_x]\\&[v_y])+f[3]*(\text{recPicture}_L[h_{x-1}][v_{y+yP1}]-\text{recPicture}_L\\&[h_x][v_y])+f[4]*(\text{recPicture}_L[h_x][v_{y+yP1}]-\\&\text{recPicture}_L[h_x][v_y])+f[5]*(\text{recPicture}_L[h_{x+1}]\\&[v_{y+yP1}]-\text{recPicture}_L[h_x][v_y])+f[6]*(\text{recPicture}_L\\&[h_x][v_{y+yP2}]-\text{recPicture}_L[h_x][v_y])\end{aligned} \quad (8\text{-}1288)$$

$$\text{scaledSum} = \text{Clip3}(-(1<<(\text{BitDepth}-1)), (1<<(\text{BitDepth}-1))-1, (\text{sum}+64)>>7) \quad (8\text{-}1289)$$

$$\text{sum} = \text{curr} + \text{scaledSum} \quad (8\text{-}1290)$$

The modified filtered reconstructed chroma picture sample array ccAlfPicture[xCtbC+x][yCtbC+y] is derived as follows:

$$\text{ccAlfPicture}[xCtbC+x][yCtbC+y] = \text{Clip3}(0, (1<<\text{BitDepth})-1, \text{sum}) \quad (8\text{-}1291)$$

TABLE 44

Specification of yP1 and yP2 according to the vertical luma sample position y*subHeightC and applyAlfLineBufBoundary

| Condition | yP1 | yP2 |
|---|---|---|
| (y*subHeightC == CtbSizeY - 5 \|\| y*subHeightC == CtbSizeY - 4) && applyAlfLineBufBoundary == 1 | 0 | 0 |
| (y*subHeightC == CtbSizeY - 6 \|\| y*subHeightC == CtbSizeY - 3) && applyAlfLineBufBoundary == 1 | 1 | 1 |
| Otherwise | 1 | 2 |

2.8.3. Singling of CC-ALF Related Syntax Elements

CC-ALF filters are signaled in APS together with ALF related syntax elements.

7.3.2.19 Adaptive Loop Filter Data Syntax

| alf_data( ) { | Descriptor |
|---|---|
|   alf_luma_filter_signal_flag | u(1) |
|   alf_chroma_filter_signal_flag | u(1) |
|   alf_cc_cb_filter_signal_flag | u(1) |
|   alf_cc_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx= 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |

-continued

| alf_data( ) { | Descriptor |
|---|---|
|   alf_chroma_num_alt_filters_minus1 | ue(v) |
|   for( altIdx = 0; altIdx <= alf_chroma_num_alt_filters_minus1; altIdx++ ) { | |
|     for( j = 0; j < 6; j++ ) { | |
|       alf_chroma_coeff_abs[ altIdx ][ j ] | ue(v) |
|       if( alf_chroma_coeff_abs[ altIdx ][ j ] > 0 ) | |
|         alf_chroma_coeff_sign[ altIdx ][ j ] | u(1) |
|     } | |
|     if( alf_chroma_clip_flag ) | |
|       for( j = 0; j < 6; j++ ) | |
|         alf_chroma_clip_idx[ altIdx ][ j ] | u(2) |
|   } | |
| } | |
|   <u>*if( alf_cc_cb_filter_signal_flag ) {*</u> | |
|     <u>*alf_cc_cb_filters_signalled_minus1*</u> | <u>*ue(v)*</u> |
|     <u>*for( k = 0; k < alf_cc_cb_filters_signalled_minus1 + 1; k++ ) {*</u> | |
|       <u>*for( j = 0; j < 7; j++ ) {*</u> | |
|         <u>*alf_cc_cb_mapped_coeff_abs[ k ][ j ]*</u> | <u>*u(3)*</u> |
|         <u>*if( alf_cc_cb_mapped_coeff_abs[ k ][ j ] )*</u> | |
|           <u>*alf_cc_cb_coeff_sign[ k ][ j ]*</u> | <u>*u(1)*</u> |
|       <u>*}*</u> | |
|     <u>*}*</u> | |
|   <u>*}*</u> | |
|   <u>*if( alf_cc_cr_filter_signal_flag ) {*</u> | |
|     <u>*alf_cc_cr_filters_signalled_minus1*</u> | <u>*ue(v)*</u> |
|     <u>*for( k = 0; k < alf_cc_cr_filters_signalled_minus1 + 1; k++ ) {*</u> | |
|       <u>*for( j = 0; j < 7; j++ ) {*</u> | |
|         <u>*alf_cc_cr_mapped_coeff_abs[ k ][ j ]*</u> | <u>*u(3)*</u> |
|         <u>*if( alf_cc_cr_mapped_coeff_abs[ k ][ j ] )*</u> | |
|           <u>*alf_cc_cr_coeff_sign[ k ][ j ]*</u> | <u>*u(1)*</u> |
|       <u>*}*</u> | |
|     <u>*}*</u> | |
|   <u>*}*</u> | |
| } | |

7.3.2.7 Picture Header Structure Syntax

| picture_header_structure( ) { | Descriptor |
|---|---|
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc ) | |
|         ph_alf_aps_id_chroma | u(3) |
|       <u>*if( sps_ccalf_enabled_flag ) {*</u> | |
|         <u>*ph_cc_alf_cb_enabled_flag*</u> | <u>*u(1)*</u> |
|         <u>*if( ph_cc_alf_cb_enabled_flag )*</u> | |
|           <u>*ph_cc_alf_cb_aps_id*</u> | <u>*u(3)*</u> |
|         <u>*ph_cc_alf_cr_enabled_flag*</u> | <u>*u(1)*</u> |

-continued

| picture_header_structure( ) { | Descriptor |
|---|---|
|         <u>*if( ph_alf_cr_enabled_flag )*</u> | |
|           <u>*ph_cc_alf_cr_aps_id*</u> | <u>*u(3)*</u> |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
| ... | |
| } | |

7.3.7 Slice Header Syntax
7.3.7.1 General Slice Header Syntax

| slice_header( ) { | Descriptor |
|---|---|
| ... | |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |

| slice_header( ) { | Descriptor |
|---|---|
|     *if( sps_ccalf_enabled_flagh ) {* | |
|         *slice_cc_alf_cb_enabled_flag* | *u(1)* |
|         *if( slice_ccalf_cb_enabled_flag )* | |
|             *slicecc_alf_cb_aps_id* | *u(3)* |
|         *slice_ccalf_cr_enabled_flag* | *u(1)* |
|         *if( slice_ccalf_cr_enabled_flag )* | |
|             *slicecc_alf_cr_aps_id* | *u(3)* |
|     *}* | |
|   } | |
| } | |
| ... | |
| } | |

7.3.10.2 Coding tree unit syntax

| coding_tree_unit( ) { | Descriptor |
|---|---|
|   xCtb = CtbAddrX << CtbLog2SizeY | |
|   yCtb = CtbAddrY << CtbLog2SizeY | |
|   if( slice_sao_luma_flag \|\| slice_sao_chroma_flag ) | |
|     sao( CtbAddrX, CtbAddrY ) | |
|   if( slice_alf_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { | |
|       if( slice_num_alf_aps_ids_luma > 0 ) | |
|       alf_use_aps_flag | ae(v) |
|       if( alf_use_aps_flag ) { | |
|         if( slice_num_alf_aps_ids_luma > 1 ) | |
|           alf_luma_prev_filter_idx | ae(v) |
|       } else | |
|         alf_luma_fixed_filter_idx | ae(v) |
|     } | |
|     if( slice_alf_chroma_idc = = 1 \|\| slice_alf_chroma_idc = = 3 ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |
|       alf_ctb_filter_alt_idx[ 0 ][ CtbAddrX ][ CtbAddrY ] | ae(v) |
|     } | |
|     if( slice_alf_chroma_idc = = 2 \|\| slice_alf_chroma_idc = = 3 ) { | |
|       alf_ctb_flag[ 2 ][ CtbAddrX ][ CtbAddrY ] | ae(v) |
|       if( alf_ctb_flag[ 2 ][ CtbAddrX ][ CtbAddrY ] | |
|         && alf_chroma_num_alt_filters_minus1 > 0 ) | |
|       alf_ctb_filter_alt_idx[ 1 ][ CtbAddrX ][ CtbAddrY ] | ae(v) |
|     } | |
|   } | |
|   *if( slice_cc_alf_cb_enabled_flag )* | |
|     *alf_ctb_cc_cb_idc[ CtbAddrX ][ CtbAddrY ]* | *ae(v)* |
|   *if( slice_cc_alf_cr_enabled_flag )* | |
|     *alf_ctb_cc_cr_idc[ CtbAddrX ][ CtbAddrY ]* | *ae(v)* |
|   if( slice_type = = I && qtbtt_dual_tree_intra_flag ) | |
|     dual_tree_implicit_qt_split( xCtb, yCtb, CtbSizeY, 0 ) | |
|   else | |
|     coding_tree( xCtb, yCtb, CtbSizeY, CtbSizeY, 1, 1, 0, 0, 0, 0, 0, | |
|         SINGLE_TREE, MODE_TYPE_ALL ) | |
| } | |

2.9. Luma Mapping with Chroma Scaling (LMCS)

The LMCS mode operates based on two domains are involved wherein including a first domain that is an original domain and a second domain that is a reshaped domain which maps luma samples to particular values according reshaping models.

The related syntax elements and semantics in picture header and slice header are described as follows:

7.3.2.7 Picture Header Structure Syntax

| picture_header_structure( ) { | Descriptor |
|---|---|
|   gdr_or_irap_pic_flag | u(1) |
|   if( gdr_or_irap_pic_flag ) | |
|     gdr_pic_flag | u(1) |
|   ... | |
|   *if( sps_lmcs_enabled_flag ) {* | |
|     *ph_lmcs_enabled_flag* | *u(1)* |
|     *if( ph_lmcs_enabled_flag ) {* | |
|       *ph_lmcs_aps_id* | *u(2)* |
|       *if( ChromaArrayType != 0 )* | |

```
picture_header_structure( ) {                                               Descriptor
        ph_chroma_residual_scale_flag                                          u(1)
      }
   }
   if( sps_scaling_list_enabled_flag ) {
      ph_scaling_list_present_flag                                             u(1)
      if( ph_scaling_list_present_flag )
         ph_scaling_list_aps_id                                                u(3)
   }
   if( sps_virtual_boundaries_enabled_flag && !sps_virtual_boundaries_present_flag ) {
      ph_virtual_boundaries_present_flag                                       u(1)
      if( ph_virtual_boundaries_present_flag ) {
         ph_num_ver_virtual_boundaries                                         u(2)
         for( i = 0; i < ph_num_ver_virtual_boundaries; i++ )
            ph_virtual_boundaries_pos_x[ i ]                                   u(13)
         ph_num_hor_virtual_boundaries                                         u(2)
         for( i = 0; i < ph_num_hor_virtual_boundaries; i++ )
            ph_virtual_boundaries_pos_y[ i ]                                   u(13)
      }
   }
}
```

7.3.7 Slice Header Syntax
7.3.7.1 General Slice Header Syntax

```
slice_header( ) {                                                          Descriptor
   picture_header_in_slice_header_flag                                        u(1)
   slice_ts_residual_coding_disabled_flag                                     u(1)
     if( ph_lmcsenabled_flag )
        slice_lmcs_enabled_flag                                               u(1)
   if( pic_scaling_list_enabled_flag )
      slice_scaling_list_present_flag                                         u(1)
   if( NumEntryPoints > 0 ) {
      offset_len_minus1                                                       ue(v)
      for( i = 0; i < NumEntryPoints; i++ )
         entry_point_offset_minus1[ i ]                                       u(v)
   }
   if( slice_header_extension_present_flag ) {
      slice_header_extension_length                                           ue(v)
      for( i = 0; i < slice_header_extension_length; i++)
         slice_header_extension_data_byte[ i ]                                u(8)
   }
   byte_alignment( )
}
``` ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

3. Examples of Technical Problems Solved By Disclosed Technical Solutions

The current design of CC-ALF has the following problems:

1. In the ALF process, the shift which represents the filter strength is adjusted based on the location of samples to be filtered to solve the artifacts due to the mirror padding. Similarly, CC-ALF may have visual quality issues for ALF virtual boundaries (VBs) since there is no adjustment for the filter strength/filter processing for filtering chroma samples crossing ALF VBs.
2. It is desirable to enable CC-ALF only when luma ALF is applied, such as the design in picture header. However, two issues are identified in current VVC specification:
   a. The slice/picture/video level CC-ALF could only be enabled when the ALF or luma ALF is enabled. However, in the CTB level, CC-ALF and ALF are controlled independently.
   b. The CC-ALF filters could be signaled even luma ALF filters are not signalled in APS.
3. It is desirable to enable chroma ALF only when luma ALF is applied, such as the design in picture header. However, two issues are identified in current VVC specification:
   a. The slice/picture/video level chroma ALF could only be enabled when the ALF or luma ALF is enabled. However, in the CTB level, chroma ALF and ALF are controlled independently.
   b. The chroma ALF filters could be signaled even luma filters are not signalled in APS.
4. The coding tool of LMCS has two parts: luma mapping (reshaping process, denoted by RP) and luma dependent chroma residual scaling (CRS). In picture header, the CRS could be disabled (e.g., ph_chroma_residual_scale_flag is equal to 0) even LMCS is enabled (i.e., in this case, only luma mapping is applied to a whole picture). However, in slice header, there is only one flag (e.g., slice_lmcs_enabled_flag) to control both RP and CRS which is not desirable.

5. The semantics of ph_lmcs_enabled_flag is conflicting with the motivation of signalling slice level LMCS flag when ph_lmcs_enabled_flag is true. In current VVC, when ph_lmcs_enabled_flag is true, it means all slices shall enable LMCS. Therefore, there is no need to further signal LMCS enabling flags in slice header.

4. Example Embodiments and Techniques

The items below should be considered as examples to explain general concepts. These items should not be interpreted in a narrow way. Furthermore, these items can be combined in any manner.

In this disclosure, the term 'CC-ALF' represents a coding tool that utilizes the sample values in a second color component (e.g., Y) or multiple color components (e.g., both Y and Cr) to refine the samples in a first color component (e.g., Cb). This disclosure is not limited to the existing CC-ALF technologies. Also, "corresponding filtering sample set" may be used to represent those samples included in a filter support, e.g., for CC-ALF, the "corresponding filtering sample set" may be used to represent the collocated luma sample and neighboring luma samples of the collocated luma sample of a chroma sample which are utilized to derive the refinement/offset of the chroma sample.

Handling ALF Virtual Boundary for CC-ALF
1. Filtering operations in CC-ALF (e.g., filter strength) may depend on the position of a chroma sample to be filtered and/or distances between the chroma sample and ALF virtual boundaries.
   a. Alternatively, it may depend on the distances between the corresponding luma sample and ALF virtual boundaries.
      i. In one example, suppose the current chroma sample is located at (x, y) relative to the chroma CTB, and the corresponding luma sample is denoted as (x*subWidthC, y*subHeightC) wherein (subWidthC, subHeightC) are derived according to the color format.
         1) In one example, the filtering operation is dependent on (y*subHeightC) and/or differences between (y*subHeightC) and ALF VBs.
   b. The CC-ALF filtering process is revised from equation (2-1) to be as follows:

$$\Delta I_i(x, y) = \left( \sum_{(x_0, y_0) \in S_i} (I_0(x_C + x_0, y_C + y_0) - I_0(x_{C_0}, y_{C_0}))c_i(x_0, y_0)) + OS \right) \gg FS$$

c. The CC-ALF filtering process is revised from equation (2-2) to be as follows:

$$\Delta I_i(x, y) = \left( \sum_{(x_0, y_0) \in S_i} Clip3(T0, T1, (I_0(x_C + x_0, y_C + y_0) - I_0(x_{C_0}, y_{C_0})))c_i(x_0, y_0)) + OS \right) \gg FS$$

d. In above sub-bullets b and c, the rounding offset OS and/or filter strength denoted by FS and/or clipping boundary T0 and/or T1 are not fixed.
      i. Alternatively, furthermore, the parameters OS and/or FS and/or T0 and/or T1 may be signaled or derived on-the-fly.
      ii. In one example, the T0 and T1 may be set equal to those parameters used in the non-linear luma ALF.

Enabling CC-ALF under Condition Check of Luma ALF
2. CC-ALF related syntax elements in APS are conditionally signalled, such as depending on whether ALF/luma ALF/chroma ALF is signalled.
   a. In one example, the signalling of indications of signalling CC-ALF filters (e.g., alf_cc_cb_filter_signal_flag and/or alf_cc_cr_filter_signal_flag) may be under the condition check of whether luma ALF filters are signalled (e.g., "if (alf_luma_filter_signal_flag)").
   b. In one example, the signalling of indications of signalling CC-ALF filters (e.g., alf_cc_cb_filter_signal_flag and/or alf_cc_cr_filter_signal_flag) may be under the condition check of whether Chroma ALF filters are signalled (e.g., "if (alf_chroma_filter_signal_flag)").
   c. In one example, indications of signalling CC-ALF filters (e.g., alf_cc_cb_filter_signal_flag and/or alf_cc_cr_filter_signal_flag) is inferred to be 0 if it is (they are) not present in the bitstream.
   d. It is required in a conformance bitstream that indications of signalling CC-ALF filters (e.g., alf_cc_cb_filter_signal_flag and/or alf_cc_cr_filter_signal_flag) must be 0 if luma ALF filter is not signalled (e.g., alf_luma_filter_signal_flag is zero).
   e. It is required in a conformance bitstream that indications of signalling CC-ALF filters (e.g., alf_cc_cb_filter_signal_flag and/or alf_cc_cr_filter_signal_flag) must be 0 if luma ALF filter is not signalled (e.g., alf_chroma_filter_signal_flag is zero).
3. A first syntax element (FSE) may control whether to apply ALF and/or CC-ALF on given color components at a video region level.
   a. In one example, the video region may be a sequence/video/slice/tile/subpicture/picture/CTU/CTB/coding unit (CU)/prediction unit (PU)/transform unit (TU)/coding block (CB)/transform block (TB)/prediction block (PB).
   b. In one example, the FSE may be signalled in SPS/picture parameter set (PPS)/PH/slice header.
   c. In one example, the first syntax element may control whether ALF and CC-ALF can be applied on any color component. If the first syntax element indicates "being disabled" (e.g. the value is equal to 0), neither ALF nor CC-ALF can be applied on any color component.
   d. In one example, the first syntax element may control whether chroma ALF and CC-ALF can be applied on any chroma color component. If the first syntax element indicates "being disabled" (e.g. the value is equal to 0), neither chroma ALF or CC-ALF can be applied on any chroma color component.
   e. In one example, the first syntax element may control whether CC-ALF can be applied on both Cb and Cr components. If the first syntax element indicates "being disabled" (e.g. the value is equal to 0), CC-ALF is disabled.

f. In one example, the first syntax element may control which chroma component that CC-ALF may be applied to.
  i. In one example, the FSE is not a binary value.
  ii. In one example, if the value is equal to 0, CC-ALF is disabled; if it is equal to 1 or 3, CC-ALF is enabled for the Cb color component; and if it is equal to 2 or 3, CC-ALF is enabled for the Cr color component.
g. In one example, one or more syntax elements at a lower level (smaller than the video region) may be signaled under the condition of the first syntax element.
  i. In one example, alf_cc_cb_filter_signal_flag and/or alf_cc_cr_filter_signal_flag and/or alf_luma_filter_signal_flag may be signaled under the condition check of "if (FSE)".
4. CC-ALF related syntax elements (e.g., in slice header or picture header, SPS/PPS/APS) may be conditionally signalled according to the enabling/signalling of chroma ALF.
  a. In one example, the signalling of CC-ALF related syntax elements in slice header may be under the condition check of the chroma ALF for the same chroma component is enabled/signalled.
5. CC-ALF related syntax elements for a color component in coding tree block (CTB) level are conditionally signalled, such as depending on whether ALF/luma ALF/chroma ALF is applied to the current CTB and/or whether CC-ALF for that color component is enabled for a slice or picture (according to the associated picture header or PPS) containing the CTB.
  a. In one example, the signalling of alf_ctb_cc_cb_idc may be under the condition check of "if(slice_cc_alf_cb_enabled_flag && alf_ctb_flag[0][CtbAddrX][CtbAddrY])".
  b. In one example, the signalling of alf_ctb_cc_cr_idc may be under the condition check of "if(slice_cc_alf_cr_enabled_flag && alf_ctb_flag[0][CtbAddrX][CtbAddrY])".
  c. In one example, the signalling of alf_ctb_cc_cb_idc may be under the condition check of "if(ph_cc_alf_cb_enabled_flag && alf_ctb_flag[0][CtbAddrX][CtbAddrY])".
  d. In one example, the signalling of alf_ctb_cc_cr_idc may be under the condition check of "if(ph_cc_alf_cr_enabled_flag && alf_ctb_flag[0][CtbAddrX][CtbAddrY])".
  e. In one example, the signalling of alf_ctb_cc_cb_idc may be under the condition check of "if(slice_cc_alf_cb_enabled_flag && alf_ctb_flag[1][CtbAddrX][CtbAddrY])".
  f. In one example, the signalling of alf_ctb_cc_cr_idc may be under the condition check of "if(slice_cc_alf_cr_enabled_flag && alf_ctb_flag[1][CtbAddrX][CtbAddrY])".
  g. In one example, the signalling of alf_ctb_cc_cb_idc may be under the condition check of "if(ph_cc_alf_cb_enabled_flag && alf_ctb_flag[2][CtbAddrX][CtbAddrY])".
  h. In one example, the signalling of alf_ctb_cc_cr_idc may be under the condition check of "if(ph_cc_alf_cr_enabled_flag && alf_ctb_flag[2][CtbAddrX][CtbAddrY])".

Enabling Chroma ALF Under Condition Check of Luma ALF
6. Chroma ALF related syntax elements in APS are conditionally signalled, such as depending on whether luma ALF is signalled.
  a. In one example, the signalling of alf_chroma_filter_signal_flag may be under the condition check of "if (alf_luma_filter_signal_flag)".
7. Chroma ALF related syntax elements for a color component in coding tree block (CTB) level are conditionally signalled, such as depending on whether luma ALF and/or chroma ALF is applied to the current CTB and/or whether Chroma ALF for that color component is enabled for a slice containing the CTB.
  a. In one example, the signalling of alf_ctb_flag[1][CtbAddrX][CtbAddrY] may be under the condition check of "if((slice_alf_chroma_idc==1||slice_alf_chroma_idc==3) && alf_ctb_flag[0][CtbAddrX][CtbAddrY])".
  b. In one example, the signalling of alf_ctb_flag[2][CtbAddrX][CtbAddrY] may be under the condition check of "if((slice_alf_chroma_idc==2||slice_alf_chroma_idc==3) && alf_ctb_flag[0][CtbAddrX][CtbAddrY])".

In the discussion, "if (slice_alf_chroma_idc==1||slice_alf_chroma_idc==3)" is equivalent to "if(slice_alf_chroma_idc & 1==1)". "if (slice_alf_chroma_idc==2||slice_alf_chroma_idc==3)" is equivalent to "if(slice_alf_chroma_idc & 2==1)".

Related to LMCS
8. Two-level control of LMCS (which includes two aspects: luma mapping (reshaping process, denoted by RP) and luma dependent chroma residual scaling (CRS)) is introduced, wherein a higher level (e.g., a picture level) and a lower level (e.g., a slice level) control are used. In addition, the following applies:
  a. In a first example, one or more of the sub-bullets below is applied:
    i. A first indicator (e.g., ph_lmcs_enabled_flag) of enabling/disabling LMCS may be signaled at the higher level (e.g., in picture header). More specifically, when the first indicator is equal to 1, it specifies that LMCS may be enabled for one, or more, or all slices associated with the picture header (PH); And when the first indicator is equal to 0, it specifies that LMCS is disabled for all slices associated with the PH. When the first indicator is not present, the value of the indicator is inferred to be equal to 0.
      1) Alternatively, furthermore, the first indicator may be conditionally signalled according to the value of a LMCS enabling flag in sequence level (e.g., sps_lmcs_enabled_flag).
    ii. A second indicator (e.g., ph_chroma_residual_scale_flag) of enabling/disabling CRS may be signaled at the higher level (e.g., in picture header). More specifically, when the second indicator is equal to 1, it specifies that CRS may be enabled for one, or more, or all slices associated with the PH. And when the second indicator is equal to 0, it specifies that CRS is disabled for all slices associated with the PH. When the second indicator is not present, it is inferred to be equal to 0.
      1) Alternatively, the second indicator may be conditionally signalled according to the value of the first indicator (e.g., whether it is equal to 1) and/or color format, and/or separate plane coding and/or "ChromaArrayType!=0" and/or whether chroma tools are present or allowed.

iii. A third indicator of enabling/disabling LMCS for the lower level (e.g., slice_lmcs_enabled_flag) may be signaled at the lower level (e.g., in slice header) and it may be signalled under the condition check of 'the first indicator is true'.
      1) It is required in a conformance bitstream that the third indicators in at least one of the lower level video units (such as slice) must be 1, if the first indicator is 1 in the higher level video unit (such as picture header) associated with the lower level video units.
   iv. A fourth indicator of enabling/disabling CRS for the lower level (e.g., slice_chroma_residual_scale_enabled_flag) may be signaled at the lower level (e.g., in slice header).
      1) In one example, it may be signalled under the condition check of 'the second indicator is true' or 'the second and third indicators are both true'.
      2) It is required in a conformance bitstream that the forth indicators in at least one of the lower level video units (such as slice) must be 1, if the second indicator is 1 in the higher level video unit (such as picture header) associated with the lower level video units.
   b. In a second example, the first and/or third indicator mentioned in the first example may be used to control the usage of RP instead of LMCS.
   c. In a third example, the condition check for signaling enabling/disabling LMCS in slice level (e.g., slice_lmcs_enabled_flag) may be replaced by "if (!ph_lmcs_enabled_flag)".
9. A first syntax element may be signalled in a video region level wherein the video region (e.g., such as a picture) is larger than a slice, and it indicates whether LMCS/RP/CRS related syntax elements are present in slice level (e.g., in slice headers) or in the video region level.
   d. Alternatively, furthermore, the LMCS/RP/CRS related syntax elements in the video region level may be signalled under the condition check of whether the first syntax element indicates LMCS/RP/CRS related syntax elements in the video region level instead of slice level.
      i. Alternatively, furthermore, when the first syntax element tells the LMCS/RP/CRS related syntax elements are present in slice level, those LMCS/RP/CRS related syntax elements in the video region level, such as in the picture header, are not signaled.
   e. Alternatively, furthermore, the LMCS/RP/CRS related syntax elements in slice level may be signalled under the condition check of whether the first syntax element indicates LMCS/RP/CRS related syntax elements are present in slice level.
      i. Alternatively, furthermore, when the first syntax element tells the LMCS/RP/CRS related syntax elements are not present in slice level, whether to and/or how to enable LMCS/RP/CRS may depend on those syntax elements in the video region level, such as in the picture header.
         1) Alternatively, furthermore, all slices follow the same behaviour as indicated in the corresponding picture header.
   f. Alternatively, furthermore, the first syntax element may be conditionally signalled, such as only when the SPS LMCS enabling flag is true.

Related to MttSplitMode

10. MttSplitMode[x0][y0][mttDepth] is set to be a value which is not equal to any of SPLIT_TT_HOR, or SPLIT_BT_HOR, or SPLIT_TT_VER, or SPLIT_BT_VER, if split_qt_flag is equal to 1. For example, MttSplitMode[x0][y0][mttDepth] is set to be SPLIT_QT if split_qt_flag is equal to 1.
11. allowBtSplit is derived based on a joint test of MttSplitMode[x0][y0][mttDepth] and split_qt_flag.
12. modeTypeCondition is derived based on a joint test of MttSplitMode[x0][y0][mttDepth] and split_qt_flag.
13. the Cross-component chroma intra prediction mode checking process is performed based on a joint test of MttSplitMode[x0][y0][mttDepth] and split_qt_flag.

General

14. Whether to and/or how to apply the disclosed methods above may be signalled at sequence level/picture level/slice level/tile group level, such as in sequence header/picture header/SPS/VPS/DCI/PPS/APS/slice header/tile group header.
15. Whether to and/or how to apply the disclosed methods above may be dependent on coded information, such as color format, single/dual tree partitioning, the position of a sample (e.g., relative to a CU/CTU).

5. Embodiments

In the following embodiments, the deletions are marked as [[ ]] and the corresponding specification additions are highlighted in boldface italic underlined.

5.1. Embodiment #1

In this embodiment, the semantics of LMCS related syntax elements in picture header is modified.
7.3.2.7 Picture Header Structure Syntax

| picture_header_structure( ) { | Descriptor |
|---|---|
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|   ... | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |

-continued

| picture_header_structure( ) { | Descriptor |
|---|---|
|     } | |
| } | |
| if( picture_header_extension_present_flag ) { | |
| ... | |
|     ph_extension_length | ue(v) |
|     for( i = 0; i < ph_extension_length; i++) | |
|         ph_extension_data_byte[ i ] | u(8) |
|   } | |
| } | |

Alternative #1 ph_lmcs_enabled_flag equal to 1 specifies that luma mapping with chroma scaling *may be* enabled. ph_lmcs_enabled_flag equal to 0 specifies that luma mapping with chroma scaling *is disabled for* is disabled for all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling *may be* enabled for the all slices associated with the PH. ph_chroma_residual_scale_flag equal to 0 specifies that chroma residual scaling *is disabled for* all slices associated with the PH. When ph_chroma_residual_scale_flag is not present, it is inferred to be equal to 0.

Alternative #2 ph_lmcs_enabled_flag equal to 1 specifies that luma mapping with chroma scaling *may be* enabled for *one, or more, or* all slices associated with the PH. ph_lmcs_enabled_flag equal to 0 specifies that luma mapping with chroma scaling *is disabled for* all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling *may be* enabled for *one, or more, or* all slices associated with the PH. ph_chroma_residual_scale_flag equal to 0 specifies that chroma residual scaling *is disabled for* all slices associated with the PH. When ph_chroma_residual_scale_flag is not present, it is inferred to be equal to 0.

5.2. Embodiment #2

In this embodiment, the semantics of LMCS related syntax elements in picture header is kept unchanged. However, for signaling the LMCS enabling flag at a lower level (e.g., a slice) the condition check of the higher level LMCS enabling flag (e.g., a picture) being true is replaced by the higher level LMCS enabling flag being false.

In the following alternative, the condition "if(!ph_lmcs_enabled_flag)" is replaced by "if(!ph_lmcs_enabled_flag)".

7.3.7 Slice Header Syntax
7.3.7.1 General Slice Header Syntax

| slice_header( ) { | Descriptor |
|---|---|
|   picture_header_in_slice_header_flag | u(1) |
| ... | |
|   slice_ts_residual_coding_disabled_flag | u(1) |
|   if(!ph_lmcs_enabled_flag ) | |
|     slice_lmcs_enabled_flag | u(1) |
|   if( pic_scaling_list_enabled_flag ) | |
|     slice_scaling_list_present_flag | u(1) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

5.3. Embodiment #3

In this embodiment, a new syntax element is introduced in a higher level (e.g., picture header) to indicate whether the LMCS related syntax elements are present at a lower level (e.g., slice header).

7.3.2.7 Picture Header Structure Syntax

| picture_header_structure( ) { | Descriptor |
|---|---|
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
| ... | |
|   } | |
|   if( sps_lmcs_enabled_flag ) { | |
|     *lmcs_in_ph_flag* | *u(1)* |
|     *if( lmcs_in_ph_flag ) {* | |
|       ph_lmcs_enabled_flag | u(1) |
|       if( ph_lmcs_enabled_flag ) { | |
|         ph_lmcs_aps_id | u(2) |
|         if( ChromaArrayType != 0 ) | |
|           ph_chroma_residual_scale_flag | u(1) |
|       } | |
|     } | |
|   } | |
|   if( picture_header_extension_present_flag ) { | |
| ... | |
|   ph_extension_length | ue(v) |
|   for( i = 0; i < ph_extension_length; i++) | |
|     ph_extension_data_byte[ i ] | u(8) |
|   } | |
| } | |

7.3.7 Slice Header Syntax
7.3.7.1 General Slice Header Syntax

| slice_header( ) { | Descriptor |
|---|---|
|   picture_header_in_slice_header_flag | u(1) |
|   ... | |
|   slice_ts_residual_coding_disabled_flag | u(1) |
|   [[if( ph_lmcs_enabled_flag)]] *if( !lmcs_in_ph_flag ) {* | |
|     slice_lmcs_enabled_flag | u(1) |
|     **slice_chroma*residual_scale*enabled_flag | u(1)** |
|   *}* | |
|   if( pic_scaling_list_enabled_flag ) | |
|     slice_scaling_list_present_flag | u(1) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

*lmcs_in_ph_flag equal to 1 specifies that slice_lmcs_enabled_flag and slice_chroma_residual_scale_enabled_flag are not present in slice header. lmcs_in_ph_flag equal to 0 specifies that slice_lmcs_enabled_flag and slice_chromma_residual_scale_enabled_flag are present in slice header* ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

5.4. Embodiment #4

This embodiment gives an example of controlling CC-ALF under chroma ALF.

| slice_header( ) { | Descriptor |
|---|---|
|   ... | |
|   if( sps_alf_enabled_flag && !alf_info_in_ph_flag ) { | u(1) |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |

-continued

| slice_header( ) { | Descriptor |
|---|---|
|       slice_alf_chroma_idc | u(2) |
|       if( slice_alf_chroma_idc ) | |
|         slice_alf_aps_id_chroma | u(3) |
|       if( sps_ccalf_enabled_flag) { | |
|         *if(slice_alf_chroma_idc & 1 != 0 )* | |
|           slice_cc_alf_cb_enabled_flag | u(1) |
|         if( slice_cc_alf_cb_enabled_flag ) | |
|           slice_cc_alf_cb_aps_id | u(3) |
|         *if(slice_alf_chroma_idc & 2 != 0 )* | |
|           slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   ... | |

5.5. Embodiment #5

This embodiment gives an example of modifying filter strength of CC-ALF when filtering chroma samples around ALF VBs.

8.8.5.7 Cross Component Filtering Process for Coding Tree Block of Chroma Samples Inputs of this process are:
- a reconstructed luma picture sample array $recPicture_L$ prior to the luma adaptive loop filtering process,
- a filtered reconstructed chroma picture sample array $alfPicture_C$,
- a chroma location (xCtbC, yCtbC) specifying the top-left sample of the current chroma coding tree block relative to the top left sample of the current picture,
- a luma location (xCtb, yCtb) specifying the top-left sample of the current luma coding tree block relative to the top left sample of the current picture
- a width ccAlfWidth of block of chroma samples
- a height ccAlfHeight of block of chroma samples
- cross component filter coefficients CcAlfCoeff[j], with j=0 . . . 6

Output of this process is the modified filtered reconstructed chroma picture sample array ccAlfPicture. For the derivation of the filtered reconstructed chroma samples ccAlfPicture[xCtbC+x][yCtbC+y], each reconstructed chroma sample inside the current chroma block of samples alfPicture$_C$[xCtbC+x][yCtbC+y] with x=0 . . . ccAlfWidth−1, y=0 . . . ccAlfHeight−1, is filtered as follows:

The luma location (xL, yL) corresponding to the current chroma sample at chroma location (xCtbC+x, yCtbC+y) is set equal to ((xCtbC+x)*SubWidthC, (yCtbC+y)*SubHeightC)

The luma locations ($h_{x+i}$, $v_{y+j}$) with i=−1 . . . 1, j=−1 . . . 2 inside the array recPicture$_L$ are derived as follows:

$h_{x+i}$=Clip3(0,pic_width_in_luma_samples−1,xL+i)  (8-1231)

$v_y$=Clip3(0,pic_height_in_luma_samples−1,yL+j)  (8-1234)

The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) and (x*SubWidthC, y*SubHeightC) as inputs.

The variables $h_{x+i}$ and $v_{y+j}$ are modified by invoking the ALF sample padding process as specified in clause 8.8.5.6 with (xCtb, yCtb), ($h_{x+i}$, $v_{y+j}$), the variable is Chroma set equal to 0, clipLeftPos, clipRightPos, clipTopPos, clipBottomPos, clipTopLeftFlag and clipBotRightFlag as input.

The variable applyAlfLineBufBoundary is derived as follows:
If the bottom boundary of the current coding tree block is the bottom boundary of current picture and pic_height_in_luma_samples−yCtb≤CtbSizeY−4, applyAlfLineBufBoundary is set equal to 0:
Otherwise, applyAlfLineBufBoundary is set equal to 1.

The vertical sample position offsets yP1 and yP2 are specified in Table 44 according to the vertical luma sample position y*subHeightC and applyAlfLineBufBoundary.

The variable curr is derived as follows:

curr=alfPicture$_C$[xCtbC+x][yCtbC+y]  (8-1286)

The array of cross component filter coefficients f[j] is derived as follows with j=0 . . . 6:

f[j]=CcAlfCoeff[j]  (8-1287)

The variable sum is derived as follows:

sum=f[0]*(recPicture$_L$[$h_x$][$v_{y-yP1}$]−recPicture$_L$[$h_x$][$v_y$])+f[1]*(recPicture$_L$[$h_{x-1}$][$v_y$]−recPicture$_L$[$h_x$][$v_y$])+f[2]*(recPicture$_L$[$h_{x+1}$][$v_y$]−recPicture$_L$[$h_x$][$v_y$])+f[3]*(recPicture$_L$[$h_{x-1}$][$v_{y+yP1}$]−recPicture$_L$[$h_x$][$v_y$])+f[4]*(recPicture$_L$[$h_x$][$v_{y+yP1}$]−recPicture$_L$[$h_x$][$v_y$])+f[5]*(recPicture$_L$[$h_{x+1}$][$v_{y+yP1}$]−recPicture$_L$[$h_x$][$v_y$])+f[6]*(recPicture$_L$[$h_x$][$v_{y+yP2}$]−recPicture$_L$[$h_x$][$v_y$])  (8-1288)

scaledSum=Clip3(−(1<<(BitDepth−1)),(1<<(BitDepth−1))−1,(sum+RoundOffset+RoundOffset)>> ccalfShiftC)  (8-1289)

sum=curr+scaledSum  (8-1290)

The modified filtered reconstructed chroma picture sample array ccAlfPicture[xCtbC+x][yCtbC+y] is derived as follows:

ccAlfPicture[xCtbC+x][yCtbC+y]=Clip3(0,(1<<BitDepth)−1,sum)  (8-1291)

TABLE 44

Specification of yP1 and yP2 according to the vertical luma sample position y*subHeightC and applyAlfLineBufBoundary

| Condition | *ccalfShiftC* | yP1 | yP2 |
|---|---|---|---|
| (y*subHeightC == CtbSizeY - 5 ‖ y*subHeightC == CtbSizeY - 4) && applyAlfLineBufBoundary == 1 | $S_0$ | 0 | 0 |
| (y*subHeightC == CtbSizeY - 6 ‖ y*subHeightC == CtbSizeY - 3) && applyAlfLineBufBoundary == 1 | $S_1$ | 1 | 1 |
| Otherwise | $S_2$ | 1 | 2 |

In above newly added text related to ccalfShiftC, the three variables $S_0$, $S_1$, and $S_2$ are integer values, such as being 10 or 7. In one example, the RoundOffset may be set equal to (1<<($S_0$−1)), or (1<<($S_1$−1)) or (1<<($S_2$−1)), depending on the location of the current chroma sample to be padded. Alternatively, it may be set to fixed value, e.g., 64; or the fixed value may be dependent on the precision of CC-ALF coefficients.

Alternatively, $S_0$ is 4. In one example, $S_1$ is 6. In one example, $S_1$ is 7.

5.6. Embodiment #6

This embodiment shows an example of MTT splitting mode. The variable allowBtSplit is derived as follows:
If one or more of the following conditions are true, allowBtSplit is set equal to FALSE:
cbSize is less than or equal to MinBtSizeY
cbWidth is greater than maxBtSize
cbHeight is greater than maxBtSize
mttDepth is greater than or equal to maxMttDepth
treeType is equal to DUAL_TREE_CHROMA and (cbWidth/SubWidthC)*(cbHeight/SubHeightC) is less than or equal to 16
treeType is equal to DUAL_TREE_CHROMA and (cbWidth/SubWidthC) is equal to 4 and btSplit is equal to SPLIT_BT_VER
treeType is equal to DUAL_TREE_CHROMA and modeType is equal to MODE_TYPE_INTRA
cbWidth*cbHeight is equal to 32 and modeType is equal to MODE_TYPE_INTER
Otherwise, if all of the following conditions are true, allowBtSplit is set equal to FALSE
btSplit is equal to SPLIT_BT_VER
y0+cbHeight is greater than pic_height_in_luma_samples
Otherwise, if all of the following conditions are true, allowBtSplit is set equal to FALSE
btSplit is equal to SPLIT_BT_VER
cbHeight is greater than 64
x0+cbWidth is greater than pic_width_in_luma_samples Otherwise, if all of the following conditions are true, allowBtSplit is set equal to FALSE
  btSplit is equal to SPLIT_BT_HOR
  cbWidth is greater than 64
  y0+ cbHeight is greater than pic_height_in_luma_samples
Otherwise, if all of the following conditions are true, allowBtSplit is set equal to FALSE
  x0+cbWidth is greater than pic_width_in_luma_samples
  y0+cbHeight is greater than pic_height_in_luma_samples
  cbWidth is greater than minQtSize
Otherwise, if all of the following conditions are true, allowBtSplit is set equal to FALSE
  btSplit is equal to SPLIT_BT_HOR
  x0+cbWidth is greater than pic_width_in_luma_samples
  y0+cbHeight is less than or equal to pic_height_in_luma_samples
Otherwise, if all of the following conditions are true, allowBtSplit is set equal to FALSE:
  mttDepth is greater than 0
  partIdx is equal to 1
  *split_qt_flag is equal to 0*
  MttSplitMode[x0][y0][mttDepth−1] is equal to parallelTtSplit
Otherwise, if all of the following conditions are true, allowBtSplit is set equal to FALSE
  btSplit is equal to SPLIT_BT_VER
  cbWidth is less than or equal to 64
  cbHeight is greater than 64
Otherwise, if all of the following conditions are true, allowBtSplit is set equal to FALSE
  btSplit is equal to SPLIT_BT_HOR
  cbWidth is greater than 64
  cbHeight is less than or equal to 64
Otherwise, allowBtSplit is set equal to TRUE.

5.7. Embodiment #7

The variable modeTypeCondition is derived as follows:
If one or more of the following conditions are true, modeTypeCondition is set equal to 0:
  slice_type is equal to I and qtbtt_dual_tree_intra_flag is equal to 1.
  modeTypeCurr is not equal to MODE_TYPE_ALL.
  chroma_format_idc is equal to 0.
  chroma_format_idc is equal to 3.
Otherwise, if one of the following conditions is true, modeTypeCondition is set equal to 1:
  cbWidth*cbHeight is equal to 64 and split_qt_flag is equal to 1.
  cbWidth*cbHeight is equal to 64, *split_qt_flag is equal to 0* and MttSplitMode[x0][y0][mttDepth] is equal to SPLIT_TT_HOR or SPLIT_TT_VER.
  cbWidth*cbHeight is equal to 32, *split_qt_flag is equal to 0* and MttSplitMode[x0][y0][mttDepth] is equal to SPLIT_BT_HOR or SPLIT_BT_VER.
Otherwise, if the following conditions is true, modeTypeCondition is set equal to 1+(slice_type !=I? 1:0):
  cbWidth*cbHeight is equal to 64, *split_qt_flag is equal to 0* and MttSplitMode[x0][y0][mttDepth] is equal to SPLIT_BT_HOR or SPLIT_BT_VER and chroma_format_idc is equal to 1.
  cbWidth*cbHeight is equal to 128, *split_qt_flag is equal to 0* and MttSplitMode[x0][y0][mttDepth] is equal to SPLIT_TT_HOR or SPLIT_TT_VER and chroma_format_idc is equal to 1.
  cbWidth is equal to 8, *split_qt_flag is equal to 0* and MttSplitMode[x0][y0][mttDepth] is equal to SPLIT_BT_VER.
  cbWidth is equal to 16, *split_qt_flag is equal to 0* and MttSplitMode[x0][y0][mttDepth] is equal to SPLIT_TT_VER.
Otherwise, modeTypeCondition is set equal to 0.

5.8. Embodiment #8

8.4.4 Cross-component Chroma Intra Prediction Mode Checking Process
Input to this process is:
  a luma location (xCb, yCb) specifying the top-left sample of the current chroma coding block relative to the top-left luma sample of the current picture.
Output to this process is:
  a variable CclmEnabled specifying if a cross-component chroma intra prediction mode is enabled (TRUE) or not enabled (FALSE) for the current chroma coding block.
The variable CclmEnabled is derived as follows:
  If sps_cclm_enabled_flag is equal to 0, CclmEnabled is set equal to 0.
  Otherwise, if one or more of the following conditions are true, CclmEnabled is set equal to 1:
    qtbtt_dual_tree_intra_flag is equal to 0.
    slice_type is not equal to 1.
    CtbLog2SizeY is less than 6.
  Otherwise the following applies:
    The variables xCb64, yCb64, yCb32 are derived as follows:

$$xCb64=(xCb>>6)<<6 \quad (236)$$

$$yCb64=(yCb>>6)<<6 \quad (237)$$

$$yCb32=(yCb>>5)<<5 \quad (238)$$

If one or more of the following conditions are true, the variable CclmEnabled is set equal to 1:
  CbWidth[1][xCb64][yCb64] is equal to 64 and CbHeight[1][xCb64][yCb64] is equal to 64.
  CqtDepth[1][xCb64][yCb64] is equal to CtbLog2SizeY−6, *split_qt_flag is equal to 0,* MttSplitMode[xCb64][yCb64][0] is equal to SPLIT_BT_HOR, CbWidth[1][xCb64][yCb32] is equal to 64 and CbHeight[1][xCb64][yCb32] is equal to 32.
  CqtDepth[1][xCb64][yCb64] is greater than CtbLog2SizeY−6.
  CqtDepth[1][xCb64][yCb64] is equal to CtbLog2SizeY−6, *split_qt_flag is equal to 0,* MttSplitMode[xCb64][yCb64][0] is equal to SPLIT_BT_HOR, and MttSplitMode[xCb64][yCb32][1] is equal to SPLIT_BT_VER.
Otherwise, the variable CclmEnabled is set equal to 0.
When CclmEnabled is equal to 1 and one of the following conditions is true, CclmEnabled is set equal to 0:
  CbWidth[0][xCb64][yCb64] and CbHeight[0][xCb64][yCb64] are both equal to 64, and intra_subpartitions_mode_flag[xCb64][yCb64] is equal to 1.

CbWidth[0][xCb64][yCb64] or CbHeight[0][xCb64][yCb64] is less than 64, and CqtDepth[0][xCb64][yCb64] is equal to CtbLog2SizeY−6.

Figure 22:
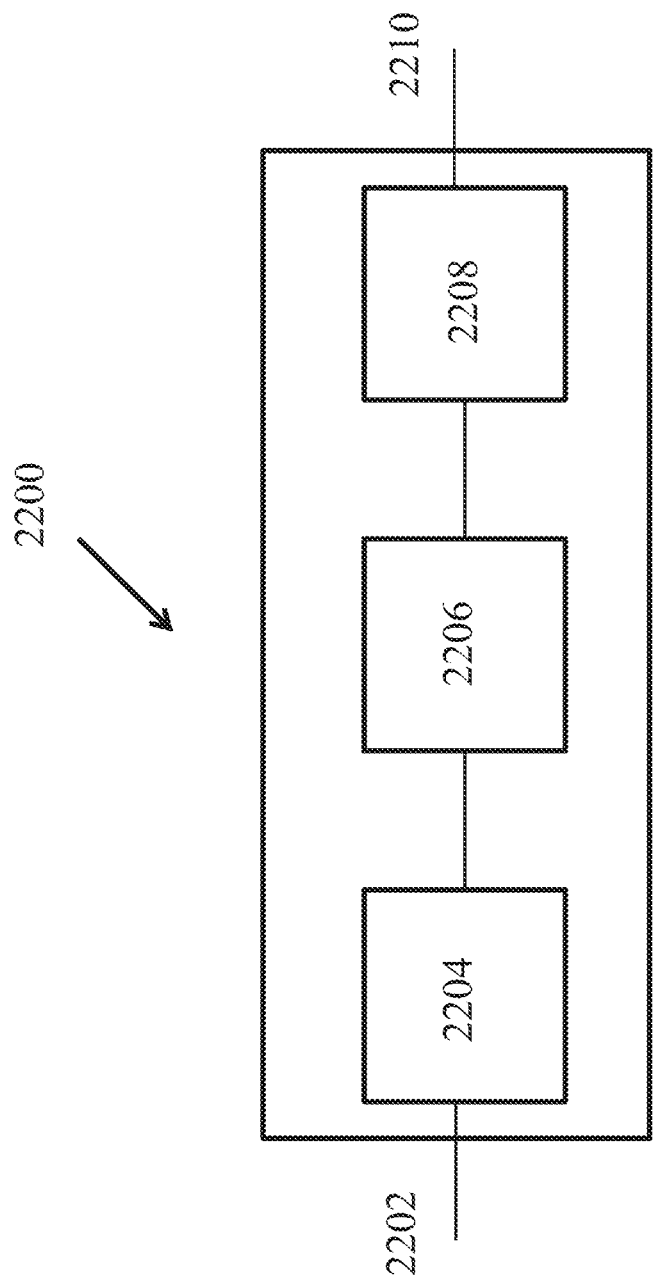
FIG. 22 is a block diagram showing an example video processing system in which various techniques disclosed herein may be implemented.

FIG. 22 is a block diagram showing an example video processing system 2200 in which various techniques disclosed herein may be implemented. Various implementations may include some or all of the components of the system 2200. The system 2200 may include input 2202 for receiving video content. The video content may be received in a raw or uncompressed format, e.g., 8 or 10 bit multi-component pixel values, or may be in a compressed or encoded format. The input 2202 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2200 may include a coding component 2204 that may implement the various coding or encoding methods described in the present document. The coding component 2204 may reduce the average bitrate of video from the input 2202 to the output of the coding component 2204 to produce a coded representation of the video. The coding techniques are therefore sometimes called video compression or video transcoding techniques. The output of the coding component 2204 may be either stored, or transmitted via a communication connected, as represented by the component 2206. The stored or communicated bitstream (or coded) representation of the video received at the input 2202 may be used by the component 2208 for generating pixel values or displayable video that is sent to a display interface 2210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 23:
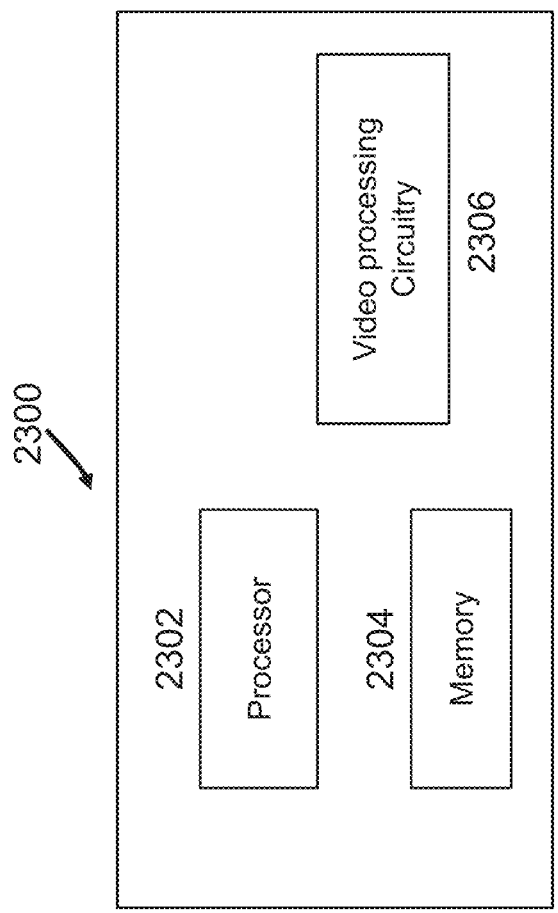
FIG. 23 is a block diagram of a video processing apparatus in accordance with the present technology.

FIG. 23 is a block diagram of a video processing apparatus 2300. The apparatus 2300 may be used to implement one or more of the methods described herein. The apparatus 2300 may be embodied in a smartphone, tablet, computer, Internet of Things (IoT) receiver, and so on. The apparatus 2300 may include one or more processors 2302, one or more memories 2304 and video processing hardware 2306. The processor(s) 2302 may be configured to implement one or more methods described in the present document. The memory (memories) 2304 may be used for storing data and code used for implementing the methods and techniques described herein. The video processing hardware 2306 may be used to implement, in hardware circuitry, some techniques described in the present document.

Figure 25:
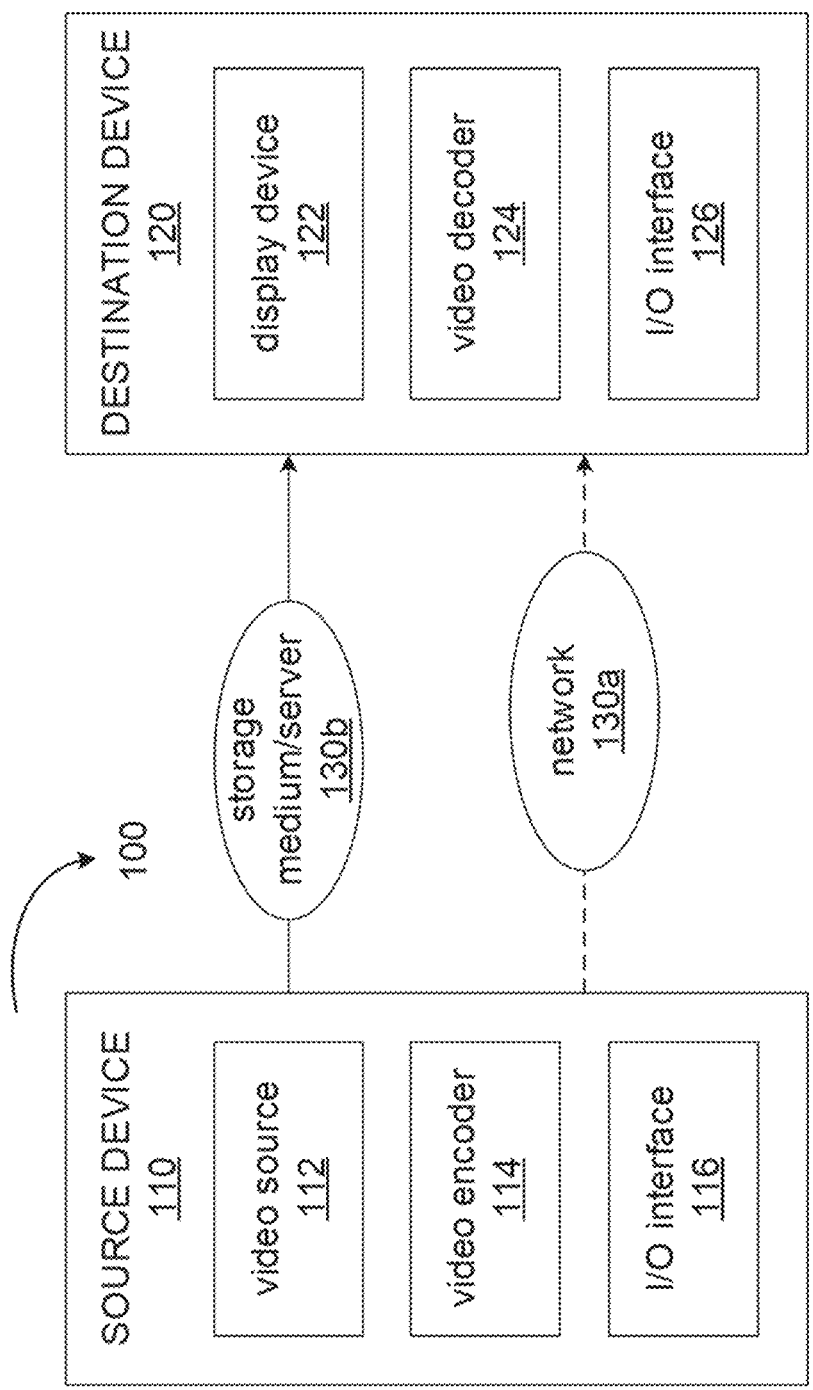
FIG. 25 is a block diagram that illustrates a video coding system in accordance with some embodiments of the present disclosure.

FIG. 25 is a block diagram that illustrates an example video coding system 100 that may utilize the techniques of this disclosure.

As shown in FIG. 25, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 26:
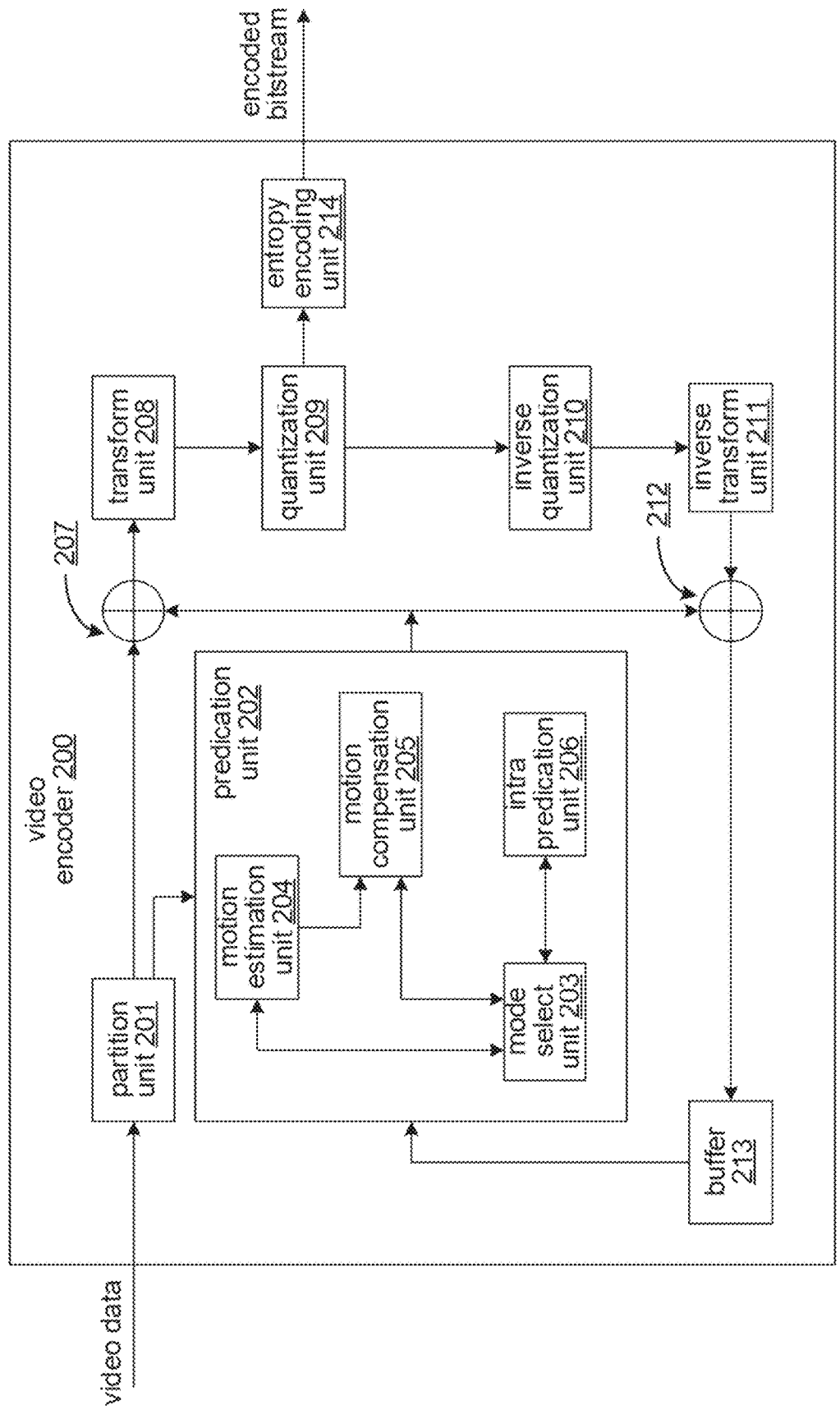
FIG. 26 is a block diagram that illustrates an encoder in accordance with some embodiments of the present disclosure.

FIG. 26 is a block diagram illustrating an example of video encoder 200, which may be video encoder 114 in the system 100 illustrated in FIG. 25.

Video encoder 200 may be configured to perform any or all of the techniques of this disclosure. In the example of FIG. 26, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 26 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an intra coded slice (I slice), a uni-directional coded slice (P slice), or a bi-directional coded slice (B slice).

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 27:
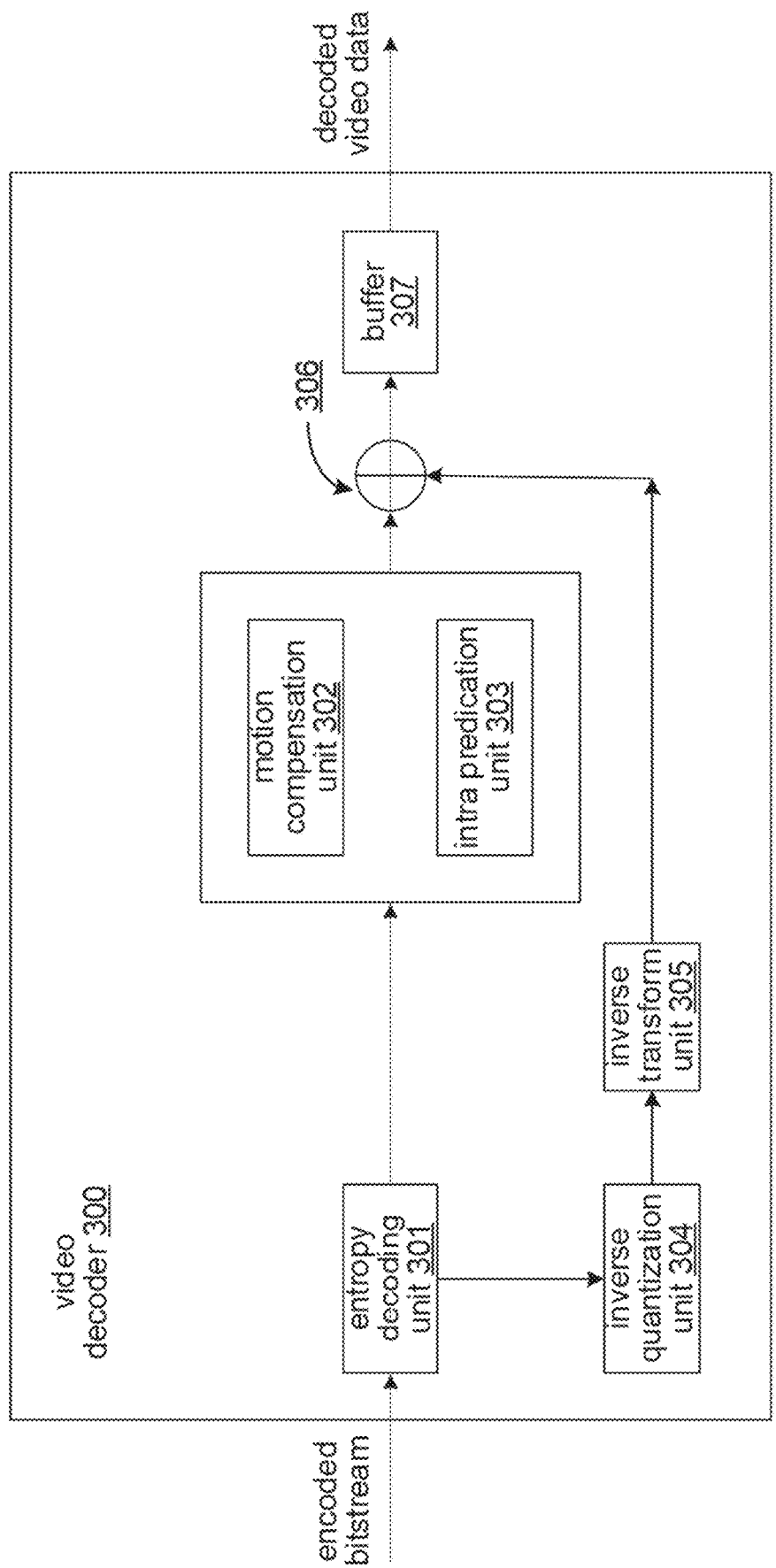
FIG. 27 is a block diagram that illustrates a decoder in accordance with some embodiments of the present disclosure.

FIG. 27 is a block diagram illustrating an example of video decoder 300 which may be video decoder 114 in the system 100 illustrated in FIG. 25.

The video decoder 300 may be configured to perform any or all of the techniques of this disclosure. In the example of FIG. 17, the video decoder 300 includes a plurality of functional components. The techniques described in this disclosure may be shared among the various components of the video decoder 300. In some examples, a processor may be configured to perform any or all of the techniques described in this disclosure.

In the example of FIG. 27, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 26).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 24:
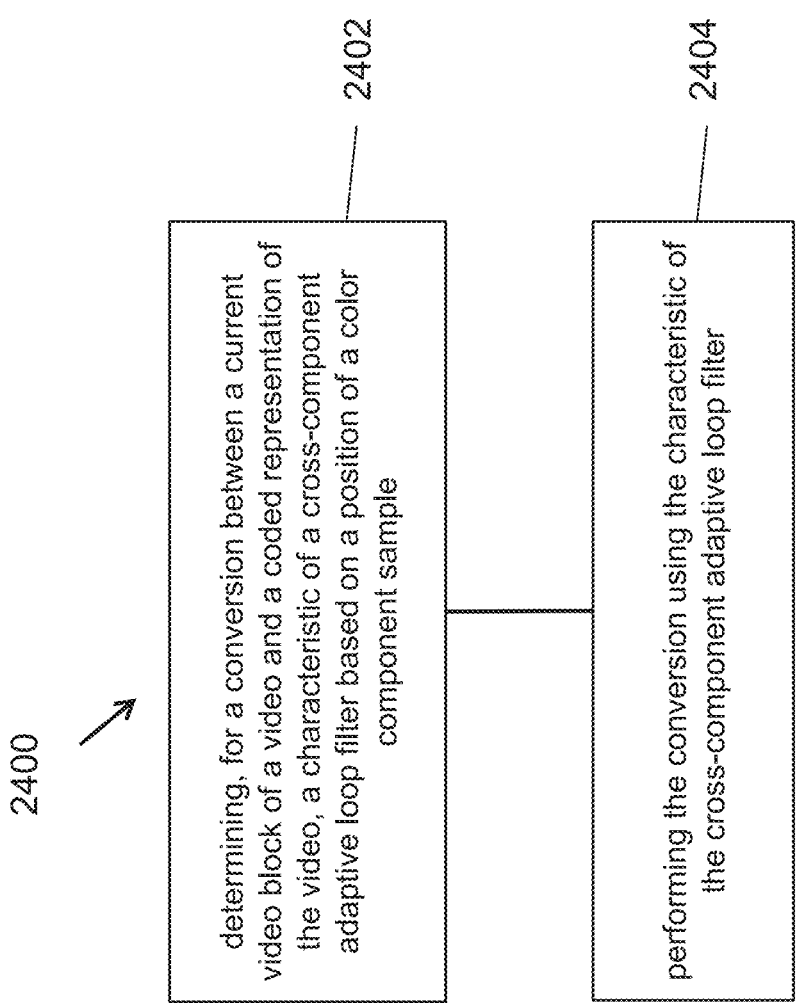
FIG. 24 is a flowchart for an example method of video processing.

1. A method of video processing (e.g., method 2400 depicted in FIG. 24), comprising: determining (2402), for a conversion between a current video block of a video and a coded representation of the video, a characteristic of a cross-component adaptive loop filter based on a position of a color component sample; and performing (2404) the conversion using the characteristic of the cross-component adaptive loop filter.

2. The method of solution 1, wherein the characteristic comprises a filter strength of the cross-component adaptive loop filter.

3. The method of any of solutions 1-2, wherein the color component is a chroma component.

4. The method of any of solutions 1-2, wherein the color component is a luma component.

5. The method of any of solutions 1-5, wherein the cross-component adaptive loop filtering is represented as:

$$\Delta I_i(x, y) = \left( \sum_{(x_0, y_0) \in S_i} \left( I_0(x_C + x_0, y_C + y_0) - I_0(x_{C_0}, y_{C_0}) \right) c_i(x_0, y_0) \right) + OS \gg FS$$

where
(x, y) is chroma component i location being refined
$(x_C, y_C)$ is the luma location based on (x, y)
$S_i$ is filter support in luma for chroma component i
$c_i(x_0, y_0)$ represents the filter coefficients.

The following solutions show example embodiments of techniques discussed in the previous section (e.g., item 2).

6. A method of video processing, comprising: performing a conversion between a video region of a video and a coded representation of the video, wherein one or more syntax elements related to use of cross-component adaptive loop filtering in the conversion are conditionally including in the coded representation based on whether another syntax element related to an adaptive loop filtering is included in the coded representation.

7. The method of solution 6, wherein the adaptive loop filtering comprises a luma adaptive loop filtering.

8. The method of solution 6, wherein the adaptive loop filtering comprises a chroma adaptive loop filtering.

The following solutions show example embodiments of techniques discussed in the previous section (e.g., item 3).

9. A method of video processing, comprising: performing a conversion between a video region of a video and a coded representation of the video, wherein a first syntax element is included in the coded representation indicative of whether an adaptive loop filter or a cross-component adaptive loop filter is applied during the conversion of the video region.

10. The method of solution 9, wherein the video region corresponds to a video sequence, or a video or a video slice or a video tile or a video subpicture or a video picture or a coding tree unit or a coding tree block or a coding unit or a prediction unit or a transform unit or a coding block or a transform block or a prediction block.

11. The method of any of solutions 9-10, wherein the first syntax element is included at a sequence parameter set level or a picture parameter set level or in a picture header or a slice header.

12. The method of any of solutions 9-11, wherein the first syntax element is indicative of whether the adaptive loop filter or the cross-component adaptive loop filter is applied to a chroma component.

13. The method of any of solutions 9-12, wherein the first syntax element is indicative of whether the adaptive loop filter or the cross-component adaptive loop filter is applied to a luma component.

The following solutions show example embodiments of techniques discussed in the previous section (e.g., item 4).

14. The method of any of solutions 1-13, wherein the coded representation conditionally includes syntax elements related to the cross-component adaptive loop filter based on whether the adaptive loop filter is applied to the chroma component.

The following solutions show example embodiments of techniques discussed in the previous section (e.g., items 6, 7).

15. A method of video processing, comprising: performing a conversion between a video region of a video and a coded representation of the video, wherein the syntax elements related to adaptive loop filtering for chroma components are conditionally included in an adaptation parameter set depending on a coding condition.

16. The method of solution 15, wherein the coding condition includes whether a syntax element related to adaptive filtering of a luma component in the video region is included in the coded representation.

17. The method of solution 16, wherein the video region comprises a coding tree block and wherein the coding condition includes (1) whether a luma adaptive loop filter is applied to the coding tree block or (2) whether a chroma adaptive loop filter is applied to the coding tree block or (3) whether a slice that includes the coding tree block is configured to use the chroma adaptive loop filter.

The following solutions show example embodiments of techniques discussed in the previous section (e.g., item 8).

18. A method of video processing, comprising: performing a conversion between a video region of a video and a coded representation of the video, wherein a format rule for the coded representations defines syntax elements that control use of a coding mode during the conversion at two levels of the video, wherein the coding mode comprises performing the conversion of the video region using a reshaping process in which sample values are represented in a first domain and a second domain and a luma dependent chroma residual scaling step.

19. The method of solution 18, wherein the syntax elements include a first indicator that is at a higher level corresponding to a group of video regions including the video region.

20. The method of solution 19, wherein the first indicator is at a picture level and in a picture header and the second indicator is at a slice level.

21. The method of any of solutions 18-20, wherein the second indicator controls use of the luma dependent chroma residual scaling step independently from the first indicator.

22. The method of any of solutions 18-20, wherein the format rule specifies a third indicator that is at a lower layer than the first indicator and further indicates applicability of the first indicator at the video region level.

23. The method of any of solutions 18-22, wherein the video region comprises a video slice.

24. The method of solution 18, wherein the video region comprises multiple slices and wherein the first indicator indicates whether the second indicator is present at a slice level.

25. The method of solution 18, wherein the video region comprises multiple slices and wherein an absence of the first indicator indicates whether the second indicator is present at a slice level.

26. The method of any of solutions 18-25, wherein the format rule specifies that the syntax elements are conditionally present depending on whether a flag signals use of the syntax elements in the coded representation.

27. The method of any of above solutions wherein a syntax element in the coded representation indicates whether the method is used for the conversion.

28. The method of any of the above solutions, wherein the conversion uses the method depending on whether coded information satisfies a condition including a color format or a partitioning scheme or positions of samples used in the conversion.

29. The method of any of solutions 1 to 28, wherein the conversion comprises encoding the video into the coded representation.

30. The method of any of solutions 1 to 28, wherein the conversion comprises decoding the coded representation to generate pixel values of the video.

31. A video decoding apparatus comprising a processor configured to implement a method recited in one or more of solutions 1 to 30.

32. A video encoding apparatus comprising a processor configured to implement a method recited in one or more of solutions 1 to 30.

33. A computer program product having computer code stored thereon, the code, when executed by a processor, causes the processor to implement a method recited in any of solutions 1 to 30.

34. A method, apparatus or system described in the present document.

Figure 28:
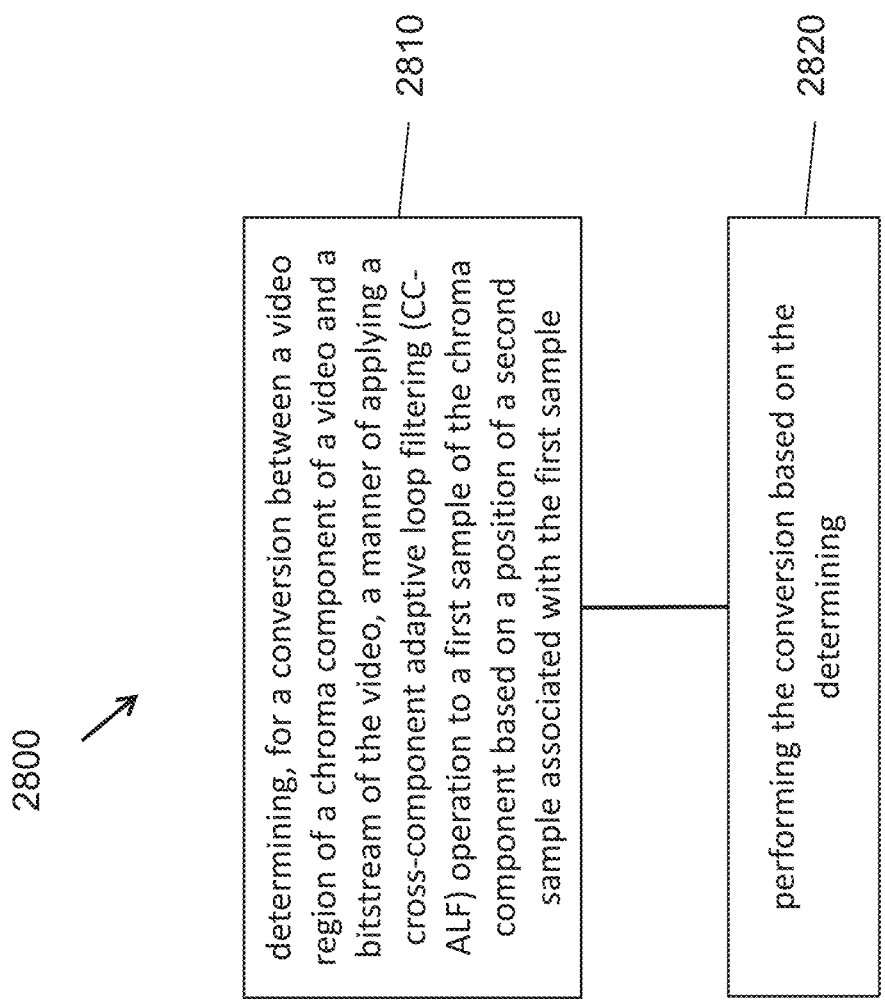
FIG. 28 is a flowchart representation of a method for video processing in accordance with the present technology.

FIG. 28 is a flowchart representation of a method 2800 for video processing in accordance with the present technology. The method 2800 includes, at operation 2810, determining, for a conversion between a video region of a chroma component of a video and a bitstream of the video, a manner of applying a cross-component adaptive loop filtering (CC-ALF) operation to a first sample of the chroma component based on a position of a second sample associated with the first sample. The method 2800 includes, at operation 2820, performing the conversion based on the determining.

In some embodiments, the manner comprises a specified filter strength used for the applying the CC-ALF operation. In some embodiments, the position of the second sample comprises a distance between the second sample and a virtual boundary of the CC-ALF operation. In some embodiments, the first sample is same as the second sample.

In some embodiments, the second sample corresponds to a luma sample associated with the first sample and the position of the second sample comprises a distance between the luma sample and a virtual boundary of the CC-ALF operation. In some embodiments, the first sample is located at (x, y) relative to the video region. The luma sample is located as (x×subWidthC, y×subHeightC), and (subWidthC, subHeightC) are determined based on a color format of the video. In some embodiments, the manner comprises applying the CC-ALF operation based on at least one of (y×subHeightC) or a difference between (y×subHeightC) and a virtual boundary of the CC-ALF operation.

In some embodiments, the manner of applying the CC-ALF operation to the first sample is further based on a color format of the video. In some embodiments, the virtual boundary of the CC-ALF operation is same as a virtual boundary of an adaptive loop filtering (ALF) operation. In some embodiments, the CC-ALF operation is represented as:

$$\Delta I_i(x, y) = ((\Sigma_{(x_0,y_0) \in S_i}(I_0(x_C+x_0, y_C+y_0) - I_0(x_{C_0}, y_{C_0}))c_i(x_0, y_0)) + OS) >> FS,$$

where (x, y) represents a location of the sample i, $(x_C, y_C)$ represents a location of the luma sample determined based on (x, y), $c_i(x_0, y_0)$ represents the filter coefficients, OS represents a rounding offset, and FS represents the filter strength. In some embodiments, the CC-ALF operation is represented as:

$$\Delta I_i(x, y) = ((\Sigma_{(x_0,y_0) \in S_i} Clip3(T0, T1, (I_0(x_C+x_0, y_C+y_0) - I_0(x_{C_0}, y_{C_0})))c_i(x_0, y_0)) + OS) >> FS,$$

where (x, y) represents a location of the sample i, $(x_C, y_C)$ represents a location of the luma sample determined based on (x, y), $c_i(x_0, y_0)$ represents the filter coefficients, OS represents a rounding offset, FS represents the filter strength, and T0 and T1 represent clipping boundaries. In some embodiments, T0 and T1 are variable values. In some embodiments, T0 and T1 are same values used in non-linear luma adaptive linear filtering. In some embodiments, OS, FS, T0 and/or T1 are derived during the conversion or included in the bitstream.

Figure 29:
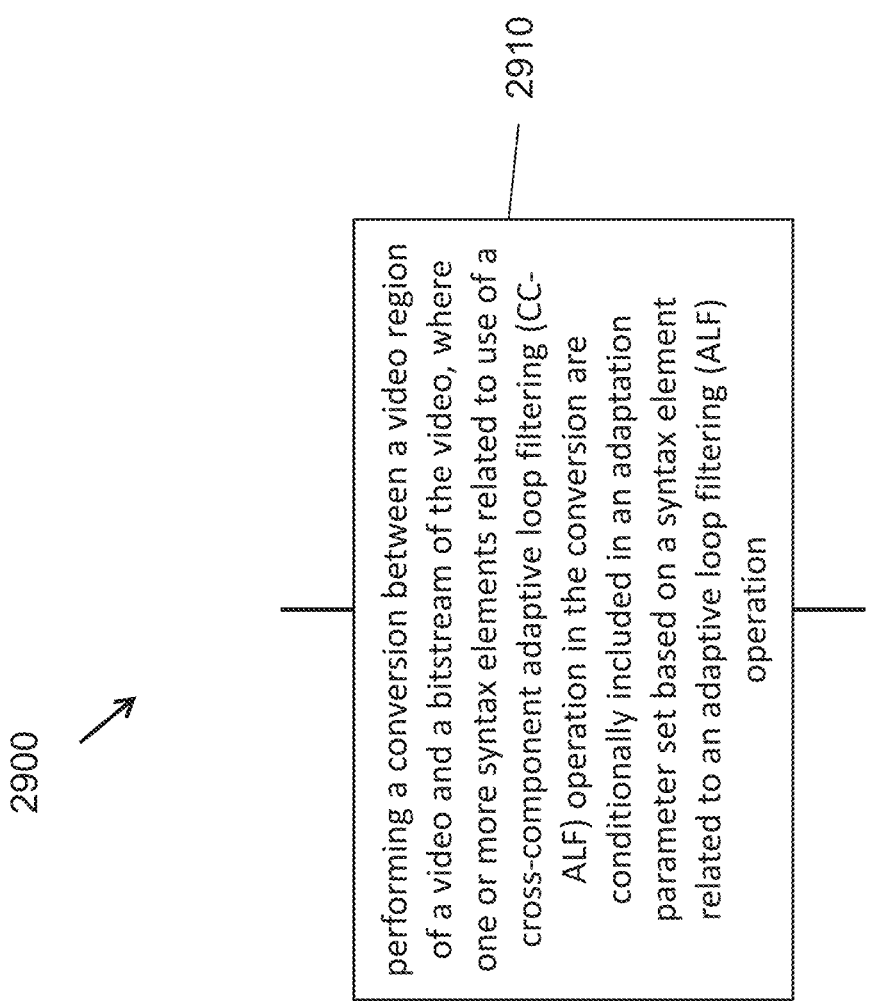
FIG. 29 is a flowchart representation of another method for video processing in accordance with the present technology.

FIG. 29 is a flowchart representation of a method 2900 for video processing in accordance with the present technology. The method 2900 includes, at operation 2910, performing a conversion between a video region of a video and a bitstream of the video. One or more syntax elements related to use of a cross-component adaptive loop filtering (CC-ALF) operation in the conversion are conditionally included in an adaptation parameter set based on a syntax element related to an adaptive loop filtering (ALF) operation. In some embodiments, the ALF operation comprises a luma adaptive loop filtering. In some embodiments, the ALF operation comprises a chroma adaptive loop filtering. In some embodiments, the one or more syntax elements related to the use of CC-ALF operation are inferred to be 0 in case the syntax element related to the ALF operation is omitted in the bitstream. In some embodiments, the bitstream conforms to a formatting rule specifying that the one or more syntax elements related to the use of the CC-ALF operation are set to 0 in case the syntax element related to the ALF operation is omitted in the bitstream. In some embodiments, the one or more syntax elements related to the use of the CC-ALF operation are included in a slice header, a picture header, a sequence parameter set, a picture parameter set, or an adaptation parameter set. In some embodiments, the one or more syntax elements related to the use of the CC-ALF operation in the slice header is based on whether the ALF operation for a same chroma component is enabled. In some embodiments, the one or more syntax elements related to the use of the CC-ALF operation for a color component in a coding tree block are conditionally included in the bitstream based on whether the ALF operation is applied to the coding tree block and/or whether the CC-ALF operation is enabled for a slice or a picture that includes the coding tree block.

Figure 30:
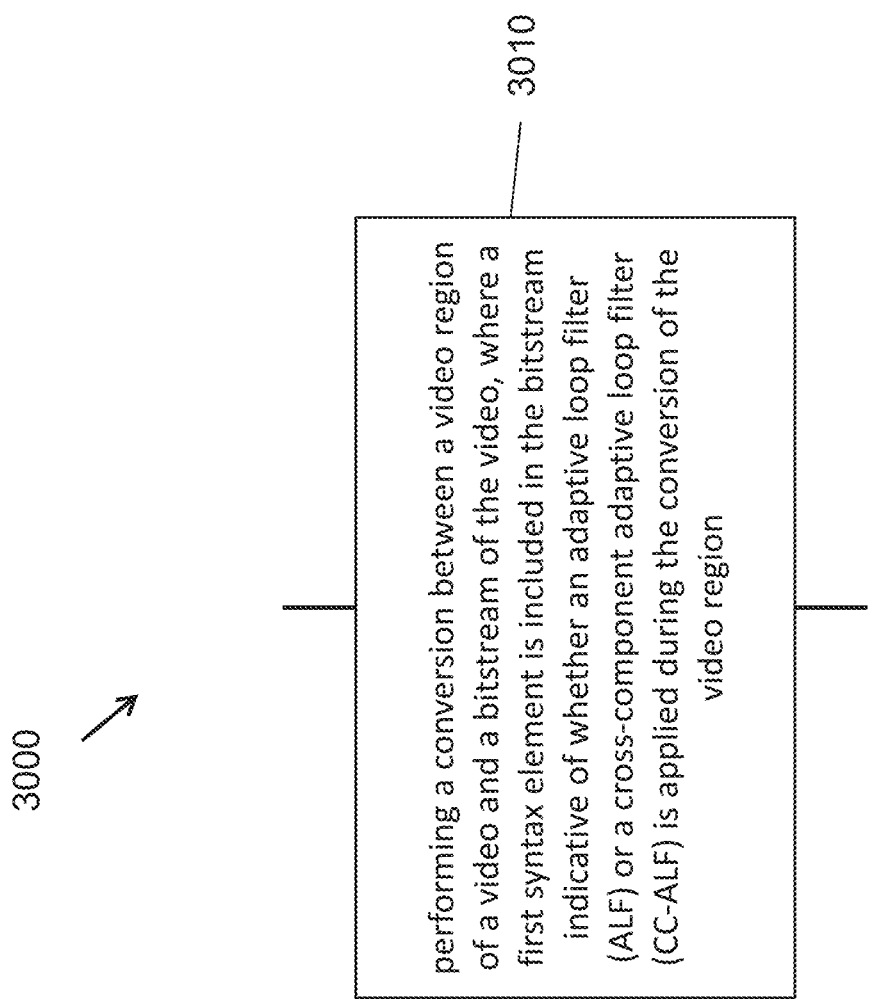
FIG. 30 is a flowchart representation of another method for video processing in accordance with the present technology.

FIG. 30 is a flowchart representation of a method 3000 for video processing in accordance with the present technology. The method 3000 includes, at operation 3010, performing a conversion between a video region of a video and a bitstream of the video. A first syntax element is included in the bitstream indicative of whether an adaptive loop filter (ALF) or a cross-component adaptive loop filter (CC-ALF) is applied during the conversion of the video region.

In some embodiments, the video region comprises a sequence, a slice, a tile, a subpicture, a picture, a coding tree unit, a coding tree block, a coding unit, a picture unit, a transform unit, a coding block, a transform block, or a picture block. In some embodiments, the first syntax element is included in a sequence parameter set, a picture parameter set, a picture header, or a slice header. In some embodiments, the first syntax element is indicative of whether the ALF or the CC-ALF is applicable to any color component of the video. In some embodiments, the color component comprises a chroma component. In some embodiments, the chroma component comprises a Cr or a Cb component. In some embodiments, the first syntax element is indicative of which color component the ALF or the CC-ALF is applicable to. In some embodiments, the first syntax element is not a binary value. In some embodiments, one or more syntax elements are conditionally included in the bitstream for a second video region that is smaller than the video region based on the first syntax element.

Figure 31:
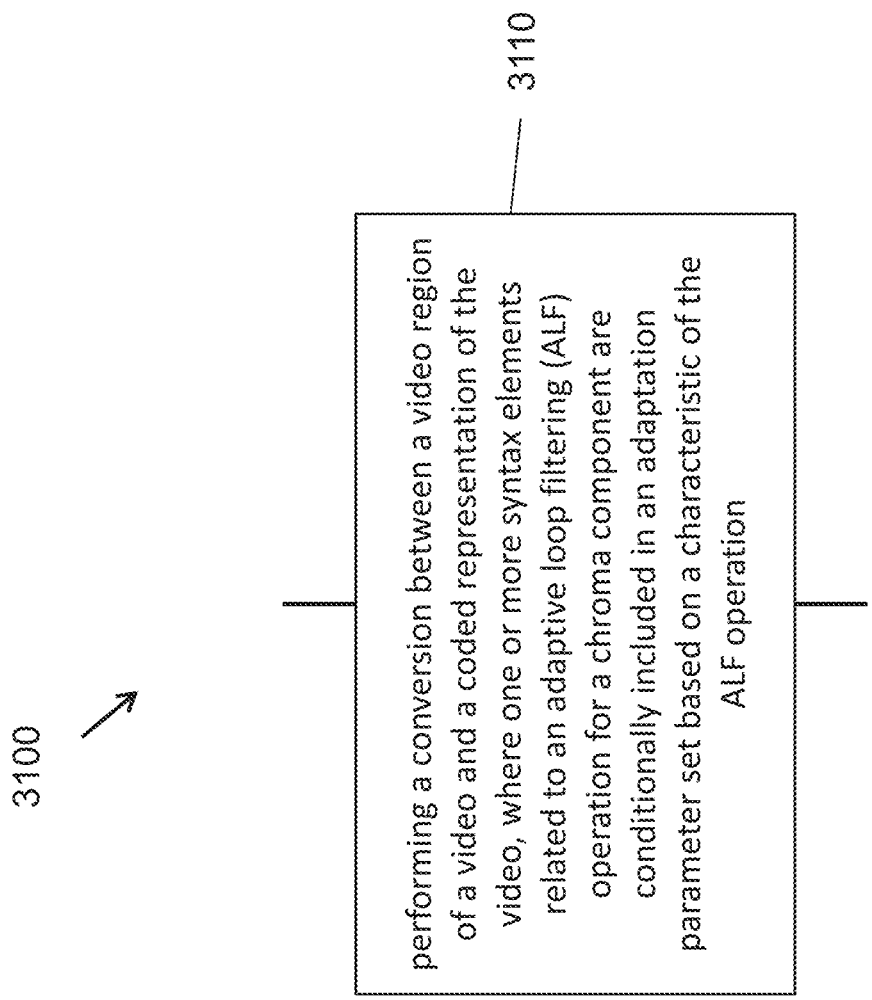
FIG. 31 is a flowchart representation of another method for video processing in accordance with the present technology.

FIG. 31 is a flowchart representation of a method 3100 for video processing in accordance with the present technology. The method 3100 includes, at operation 3110, performing a conversion between a video region of a video and a coded representation of the video. One or more syntax elements related to an adaptive loop filtering (ALF) operation for a chroma component are conditionally included in an adaptation parameter set based on a characteristic of the ALF operation.

In some embodiments, the characteristic comprises whether the ALF operation for a luma component is included in the bitstream. In some embodiments, the one or more syntax elements related to the ALF operation are for a color component in a coding tree block, and the characteristic comprises whether a luma or chrome ALF operation is applied to the coding tree block and whether a chroma ALF operation is for the color component is enabled for a slice that includes the coding tree block.

Figure 32:
FIG. 32 is a flowchart representation of another method for video processing in accordance with the present technology.

FIG. 32 is a flowchart representation of a method 3200 for video processing in accordance with the present technology. The method 3200 includes, at operation 3210, performing a conversion between a video and a bitstream of the video. The bitstream conforms to a format rule specifying that use of a luma mapping with chroma scaling (LMCS) coding mode is controlled using a two-level signaling mechanism comprising signaling at a first level of a first video region and a second level of a second video region associated in the first video region, where the first level is higher than the second level. The LMCS coding mode comprises performing the conversion using a reshaping process in which sample values represented in a first domain are mapped to a reshaped domain and a luma-dependent chroma residual scaling (CRS) process.

In some embodiments, the two-level signaling mechanism comprising signaling a first syntax element in the higher level and signaling a second syntax element in the lower level based on the first syntax element. The first syntax element indicates whether the LMCS coding mode or a process associated with the LMCS coding mode is enabled for the first video region, and the format rule specifies that the second syntax element is equal to 1 in case the first syntax element is equal to 1. In some embodiments, the first syntax element indicates whether the reshaping process is enabled. In some embodiments, the first syntax element indicates whether the CRS process is enabled. In some embodiments, the first video region comprises a picture header. In some embodiments, the second video region comprises a slice.

In some embodiments, the first syntax element comprises a first indicator that is conditionally included based on whether the LMCS coding mode is enabled at a sequence level. In some embodiments, the first syntax element comprises a second indicator that is conditionally included based on whether the LMCS coding mode is enabled in the picture head, a color format of the video, a separate plane coding mode of the video, or whether chroma tools are present or allowed. In some embodiments, the second syntax element comprises a third indicator that is conditionally included in the bitstream based on the first indicator. In some embodiments, the second syntax element comprises a fourth indicator that is conditionally included in the bitstream based on the second indicator and/or the third indicator.

In some embodiments, the two-level signaling mechanism comprising signaling a first syntax element in the higher level indicating whether one or more syntax elements related to the LMCS coding mode are present in the first video region or the second video region. In some embodiments, in case the first syntax element indicates that the one or more syntax elements related to the LMCS coding mode are present in the second video region, syntax element related to the LMCS coding mode in the first video region are omitted in the bitstream. In some embodiments, in case the first syntax element indicates that the one or more syntax elements related to the LMCS coding mode are present in the first video region, syntax element related to the LMCS coding mode in the second video region are omitted in the bitstream.

Figure 33:
FIG. 33 is a flowchart representation of yet another method for video processing in accordance with the present technology.

FIG. 33 is a flowchart representation of a method 3300 for video processing in accordance with the present technology. The method 3300 includes, at operation 3310, performing a conversion between a video region of a video and a bitstream of the video. The bitstream conforms to a format rule specifying that, in case a syntax flag indicates that the video region is split using a quad-tree split method, a value of a syntax element indicating a split mode is not equal to any of (1) a horizontal ternary tree split mode, (2) a horizontal binary tree split mode, (3) a vertical ternary tree split mode, or (4) a vertical binary tree split mode.

In some embodiments, whether a binary tree splitting method is allowed for the video region is determined based on the syntax element and the syntax flag. In some embodiments, a condition for a splitting mode is determined based on the syntax element and the syntax flag. In some embodiments, a cross-component chroma intra prediction mode is determined based on the syntax element and the syntax flag.

In some embodiments, a manner of applying the method is included at a sequence level, a picture level, a slice level, or a tile group level, comprising a sequence header, a picture header, a sequence parameter set, a video parameter set, a picture parameter set, an adaptation parameter set, a slice header, or a tile group header. In some embodiments, a manner of applying the method is based on coded information of the video that comprises a color format, a partitioning method, or a position of a sample relative to a coding unit or a coding tree unit.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (CD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a video region of a chroma component of a video and a bitstream of the video, a filter strength used in a cross-component loop filtering operation for a first sample of the video region, wherein the filter strength is determined based on a first distance between the first sample and a chroma virtual boundary and a second distance between a corresponding luma sample of the first sample and a luma virtual boundary; and
   performing the conversion based on the filter strength,
   wherein in the cross-component loop filtering operation, reconstructed luma picture samples prior to a luma adaptive loop filtering process and a filtered reconstructed chroma picture sample after a chroma adaptive loop filtering process of the first sample are used to derive the cross-component filtered value of the first sample, and the filter strength is applied to the reconstructed luma picture samples.

2. The method of claim 1, wherein the first sample is located at (x, y) relative to a top-left sample of the video region, and the corresponding luma sample of the first sample is located at (x×subWidthC, y×subHeightC), and wherein subWidthC and subHeightC are chroma subsampling rates in horizontal direction and vertical direction and the chroma subsampling rates are determined based on a color format of the video.

3. The method of claim 1, wherein the video region satisfies that a bottom boundary of the video region is not a bottom boundary of a current picture including the video region, or a difference between a height of the current picture in units of luma samples and a vertical location of a corresponding luma sample of a top-left sample of the video region is greater than a size of a coding tree block in units of luma samples minus 4.

4. The method of claim 2, wherein the cross-component loop filtering operation has a 4×3 filter shape, −yP1, yL, yP1, yP2 are y-coordinates of four sample rows in the 4×3 filter shape, whereby −yP1=−1, yL=0, yP1=1, yP2=2 and the corresponding luma sample of the first sample is in a row yL=0.

5. The method of claim 4, wherein, in a case that a vertical location of the corresponding luma sample of the first sample is at CtbSizeY−3 or CtbSizeY−6 of a coding tree block, a luma sample (x, yP2) in a row at yP2 is padded using a luma sample (x, yP1) in a row at yP1, and wherein CtbSizeY is a size of the coding tree block in units of luma samples.

6. The method of claim 4, wherein, in a case that a vertical location of the corresponding luma sample of the first sample is at CtbSizeY−4 or CtbSizeY−5, a luma sample (x, −yP1) in a row at −yP1 is padded using a luma sample (x, yL) in a row of the corresponding luma sample of the first sample, a luma sample (x, yP1) in a row at yP1 is padded using a luma sample (x, yL) in a row of the corresponding luma sample of the first sample, and a luma sample (x, yP2) in a row at yP2 is padded using a luma sample (x, yL) in a row of the corresponding luma sample of the first sample, and wherein CtbSizeY is a size of a coding tree block in units of luma samples.

7. The method of claim 1, wherein the conversion comprises decoding the video from the bitstream.

8. The method of claim 1, wherein the conversion comprises encoding the video into the bitstream.

9. An apparatus for processing video data comprising a processor and a non-transitory memory with instructions thereon, wherein the instructions upon execution by the processor, cause the processor to:
   determine, for a conversion between a video region of a chroma component of a video and a bitstream of the video, a filter strength used in a cross-component loop filtering operation for a first sample of the video region, wherein the filter strength is determined based on a first distance between the first sample and a chroma virtual boundary and a second distance between a corresponding luma sample of the first sample and a luma virtual boundary; and perform the conversion based on the filter strength,
wherein in the cross-component loop filtering operation, reconstructed luma picture samples prior to a luma adaptive loop filtering process and a filtered reconstructed chroma picture sample after a chroma adaptive loop filtering process of the first sample are used to derive the cross-component filtered value of the first sample, and the filter strength is applied to the reconstructed luma picture samples.

10. The apparatus of claim 9, wherein the first sample is located at (x, y) relative to a top-left sample of the video region, and the corresponding luma sample of the first sample is located at (x×subWidthC, y×subHeightC), and wherein subWidthC and subHeightC are chroma subsampling rates in horizontal direction and vertical direction and the chroma subsampling rates are determined based on a color format of the video.

11. The apparatus of claim 9, wherein the video region satisfies that a bottom boundary of the video region is not a bottom boundary of a current picture including the video region, or a difference between a height of the current picture in units of luma samples and a vertical location of a corresponding luma sample of a top-left sample of the video region is greater than a size of a coding tree block in units of luma samples minus 4.

12. The apparatus of claim 10, wherein the cross-component loop filtering operation has a 4×3 filter shape, −yP1, yL, yP1, yP2 are y-coordinates of four sample rows in the 4×3 filter shape, whereby −yP1=−1, yL=0, yP1=1, yP2=2 and the corresponding luma sample of the first sample is in a row yL=0;
wherein, in a case that a vertical location of the corresponding luma sample of the first sample is at CtbSizeY−3 or CtbSizeY−6 of a coding tree block, a luma sample (x, yP2) in a row at yP2 is padded using a luma sample (x, yP1) in a row at yP1, and wherein CtbSizeY is a size of the coding tree block in units of luma samples; or
wherein, in a case that a vertical location of the corresponding luma sample of the first sample is at CtbSizeY−4 or CtbSizeY−5, a luma sample (x, −yP1) in a row at −yP1 is padded using a luma sample (x, yL) in a row of the corresponding luma sample of the first sample, a luma sample (x, yP1) in a row at yP1 is padded using a luma sample (x, yL) in a row of the corresponding luma sample of the first sample, and a luma sample (x, yP2) in a row at yP2 is padded using a luma sample (x, yL) in a row of the corresponding luma sample of the first sample, and wherein CtbSizeY is a size of a coding tree block in units of luma samples.

13. A non-transitory computer-readable storage medium storing instructions that cause a processor to:
determine, for a conversion between a video region of a chroma component of a video and a bitstream of the video, a filter strength used in a cross-component loop filtering operation for a first sample of the video region, wherein the filter strength is determined based on a first distance between the first sample and a chroma virtual boundary and a second distance between a corresponding luma sample of the first sample and a luma virtual boundary; and
perform the conversion based on the filter strength,
wherein in the cross-component loop filtering operation, reconstructed luma picture samples prior to a luma adaptive loop filtering process and a filtered reconstructed chroma picture sample after a chroma adaptive loop filtering process of the first sample are used to derive the cross-component filtered value of the first sample, and the filter strength is applied to the reconstructed luma picture samples.

14. The non-transitory computer-readable storage medium of claim 13, wherein the first sample is located at (x, y) relative to a top-left sample of the video region, and the corresponding luma sample of the first sample is located at (x×subWidthC, y×subHeightC), and wherein subWidthC and subHeightC are chroma subsampling rates in horizontal direction and vertical direction and the chroma subsampling rates are determined based on a color format of the video.

15. The non-transitory computer-readable storage medium of claim 13, wherein the video region satisfies that a bottom boundary of the video region is not a bottom boundary of a current picture including the video region, or a difference between a height of the current picture in units of luma samples and a vertical location of a corresponding luma sample of a top-left sample of the video region is greater than a size of a coding tree block in units of luma samples minus 4.

16. The non-transitory computer-readable storage medium of claim 14, wherein the cross-component loop filtering operation has a 4×3 filter shape, −yP1, yL, yP1, yP2 are y-coordinates of four sample rows in the 4×3 filter shape, whereby −yP1=−1, yL=0, yP1=1, yP2=2 and the corresponding luma sample of the first sample is in a row yL=0;
wherein, in a case that a vertical location of the corresponding luma sample of the first sample is at CtbSizeY−3 or CtbSizeY−6 of a coding tree block, a luma sample (x, yP2) in a row at yP2 is padded using a luma sample (x, yP1) in a row at yP1, and wherein CtbSizeY is a size of the coding tree block in units of luma samples; or
wherein, in a case that a vertical location of the corresponding luma sample of the first sample is at CtbSizeY−4 or CtbSizeY−5, a luma sample (x, −yP1) in a row at −yP1 is padded using a luma sample (x, yL) in a row of the corresponding luma sample of the first sample, a luma sample (x, yP1) in a row at yP1 is padded using a luma sample (x, yL) in a row of the corresponding luma sample of the first sample, and a luma sample (x, yP2) in a row at yP2 is padded using a luma sample (x, yL) in a row of the corresponding luma sample of the first sample, and wherein CtbSizeY is a size of a coding tree block in units of luma samples.

17. A non-transitory computer-readable recording medium storing a bitstream of a video which is generated by a method performed by a video processing apparatus, wherein the method comprises:
determining, for a video region of a chroma component of a video, a filter strength used in a cross-component loop filtering operation for a first sample of the video region, wherein the filter strength is determined based on a first distance between the first sample and a chroma virtual boundary and a second distance between a corresponding luma sample of the first sample and a luma virtual boundary; and
generating the bitstream based on the filter strength,
wherein in the cross-component loop filtering operation, reconstructed luma picture samples prior to a luma adaptive loop filtering process and a filtered reconstructed chroma picture sample after a chroma adaptive loop filtering process of the first sample are used to derive the cross-component filtered value of the first sample, and the filter strength is applied to the reconstructed luma picture samples.

18. The non-transitory computer-readable recording medium of claim 17, wherein the first sample is located at (x, y) relative to a top-left sample of the video region, and the corresponding luma sample of the first sample is located at (x×subWidthC, y×subHeightC), and wherein subWidthC and subHeightC are chroma subsampling rates in horizontal direction and vertical direction and the chroma subsampling rates are determined based on a color format of the video.

19. The non-transitory computer-readable recording medium of claim 17, wherein the video region satisfies that a bottom boundary of the video region is not a bottom boundary of a current picture including the video region, or a difference between a height of the current picture in units of luma samples and a vertical location of a corresponding luma sample of a top-left sample of the video region is greater than a size of a coding tree block in units of luma samples minus 4.

20. The non-transitory computer-readable recording medium of claim 18, wherein the cross-component loop filtering operation has a 4×3 filter shape, −yP1, yL, yP1, yP2 are y-coordinates of four sample rows in the 4×3 filter shape, whereby −yP1=−1, yL=0, yP1=1, yP2=2 and the corresponding luma sample of the first sample is in a row yL=0;

wherein, in a case that a vertical location of the corresponding luma sample of the first sample is at CtbSizeY−3 or CtbSizeY−6 of a coding tree block, a luma sample (x, yP2) in a row at yP2 is padded using a luma sample (x, yP1) in a row at yP1, and wherein CtbSizeY is a size of the coding tree block in units of luma samples; or wherein, in a case that a vertical location of the corresponding luma sample of the first sample is at CtbSizeY−4 or CtbSizeY−5, a luma sample (x, −yP1) in a row at −yP1 is padded using a luma sample (x, yL) in a row of the corresponding luma sample of the first sample, a luma sample (x, yP1) in a row at yP1 is padded using a luma sample (x, yL) in a row of the corresponding luma sample of the first sample, and a luma sample (x, yP2) in a row at yP2 is padded using a luma sample (x, yL) in a row of the corresponding luma sample of the first sample, and wherein CtbSizeY is a size of a coding tree block in units of luma samples.

* * * * *